US010168678B2

United States Patent
Belveal et al.

(10) Patent No.: US 10,168,678 B2
(45) Date of Patent: Jan. 1, 2019

(54) INTERFACING WITH LAUNDRY SERVICES AND FACILITIES

(71) Applicant: Laundry 2.0, LLC, Tampa, FL (US)

(72) Inventors: Benjamin Todd Belveal, Tampa, FL (US); Dexter S. Weiss, Austin, TX (US); William Justin Barbino, Naperville, IL (US); Charles Walden, Austin, TX (US)

(73) Assignee: Laundry 2.0, LLC, Tampa, FL (US)

( * ) Notice: Subject to any disclaimer, the term of this patent is extended or adjusted under 35 U.S.C. 154(b) by 139 days.

(21) Appl. No.: 15/267,943

(22) Filed: Sep. 16, 2016

(65) Prior Publication Data

US 2017/0085390 A1    Mar. 23, 2017

Related U.S. Application Data

(60) Provisional application No. 62/220,174, filed on Sep. 17, 2015, provisional application No. 62/220,183,
(Continued)

(51) Int. Cl.
*G05B 15/02*       (2006.01)
*G06Q 10/02*       (2012.01)
(Continued)

(52) U.S. Cl.
CPC .......... *G05B 15/02* (2013.01); *D06F 39/005* (2013.01); *D06F 58/28* (2013.01); *G05B 19/409* (2013.01);
(Continued)

(58) Field of Classification Search
CPC ....... G05B 15/02; G05B 19/409; H04W 4/80; H04W 4/70; H04W 4/005; H04W 4/008;
(Continued)

(56) References Cited

U.S. PATENT DOCUMENTS

| 4,982,468 A | 1/1991 | Takahashi et al. |
| 7,418,521 B2 | 8/2008 | Schroeder et al. |

(Continued)

FOREIGN PATENT DOCUMENTS

| DE | 102012009821 A1 | 12/2012 |
| JP | 2002239300 A1 | 8/2002 |

(Continued)

OTHER PUBLICATIONS

Jang, International Search Report and Written Opinion, International application No. PCT/US2016/052324, dated Jan. 5, 2017, 9 pages.

*Primary Examiner* — Nathan L Laughlin
(74) *Attorney, Agent, or Firm* — Fish & Richardson P.C.

(57) ABSTRACT

Techniques are described for providing access to and use of laundry machines that are managed and controlled in a laundry service. A transceiver of a mobile device may receive a beacon signal emitted from a laundry machine, the beacon signal identifying the laundry machine. Based on a received strength of the beacon signal the mobile device may determine that it is within a threshold distance of the laundry machine, and the mobile device may communicate a request for use of the laundry machine during a predetermined period of time (e.g., one or more cycles). In some cases, the mobile device may present a user interface that enables a user to request use of laundry machine(s), access information describing a status of laundry in laundry machine(s), request additional service(s), and so forth.

20 Claims, 30 Drawing Sheets

Related U.S. Application Data filed on Sep. 17, 2015, provisional application No. 62/220,171, filed on Sep. 17, 2015.

(51) Int. Cl.

| | |
|---|---|
| *H04L 12/28* | (2006.01) |
| *D06F 58/28* | (2006.01) |
| *H04W 4/70* | (2018.01) |
| *H04W 4/80* | (2018.01) |
| *D06F 39/00* | (2006.01) |
| *G05B 19/409* | (2006.01) |
| *D06F 33/02* | (2006.01) |

(52) U.S. Cl.
CPC ........... *G06Q 10/02* (2013.01); *H04L 12/282* (2013.01); *H04L 12/2818* (2013.01); *H04W 4/70* (2018.02); *H04W 4/80* (2018.02); *D06F 33/02* (2013.01); *D06F 2058/2883* (2013.01); *D06F 2210/00* (2013.01); *G05B 2219/2633* (2013.01); *H04L 2012/285* (2013.01); *H04L 2012/2841* (2013.01)

(58) Field of Classification Search
CPC ............... H04L 12/282; H04L 12/2818; D06F 39/005; D06F 58/28; G06Q 10/02
See application file for complete search history.

(56) References Cited

U.S. PATENT DOCUMENTS

| | | | |
|---|---|---|---|
| 7,926,309 | B2 | 4/2011 | Kim et al. |
| 8,602,199 | B1 | 12/2013 | Palombi |
| 8,856,045 | B1 | 10/2014 | Patel et al. |
| 2003/0097304 | A1* | 5/2003 | Hunt ............... G06Q 10/087 705/22 |
| 2008/0281664 | A1* | 11/2008 | Campbell ............. G06Q 10/02 705/5 |
| 2011/0295706 | A1 | 12/2011 | Urquhart |
| 2013/0346300 | A1 | 12/2013 | Kang et al. |
| 2014/0250019 | A1* | 9/2014 | Causey ............. G06Q 30/0645 705/307 |
| 2014/0300450 | A1 | 10/2014 | Ha et al. |
| 2015/0262431 | A1* | 9/2015 | Berman ................ G07B 15/02 705/13 |
| 2017/0081796 | A1 | 3/2017 | Belveal et al. |
| 2017/0082991 | A1 | 3/2017 | Belveal et al. |

FOREIGN PATENT DOCUMENTS

| | | |
|---|---|---|
| JP | 2005339046 A1 | 12/2005 |
| JP | 2014104279 A1 | 6/2014 |
| KR | 2013001645 A1 | 1/2013 |
| WO | WO2017049220 A1 | 3/2017 |

\* cited by examiner

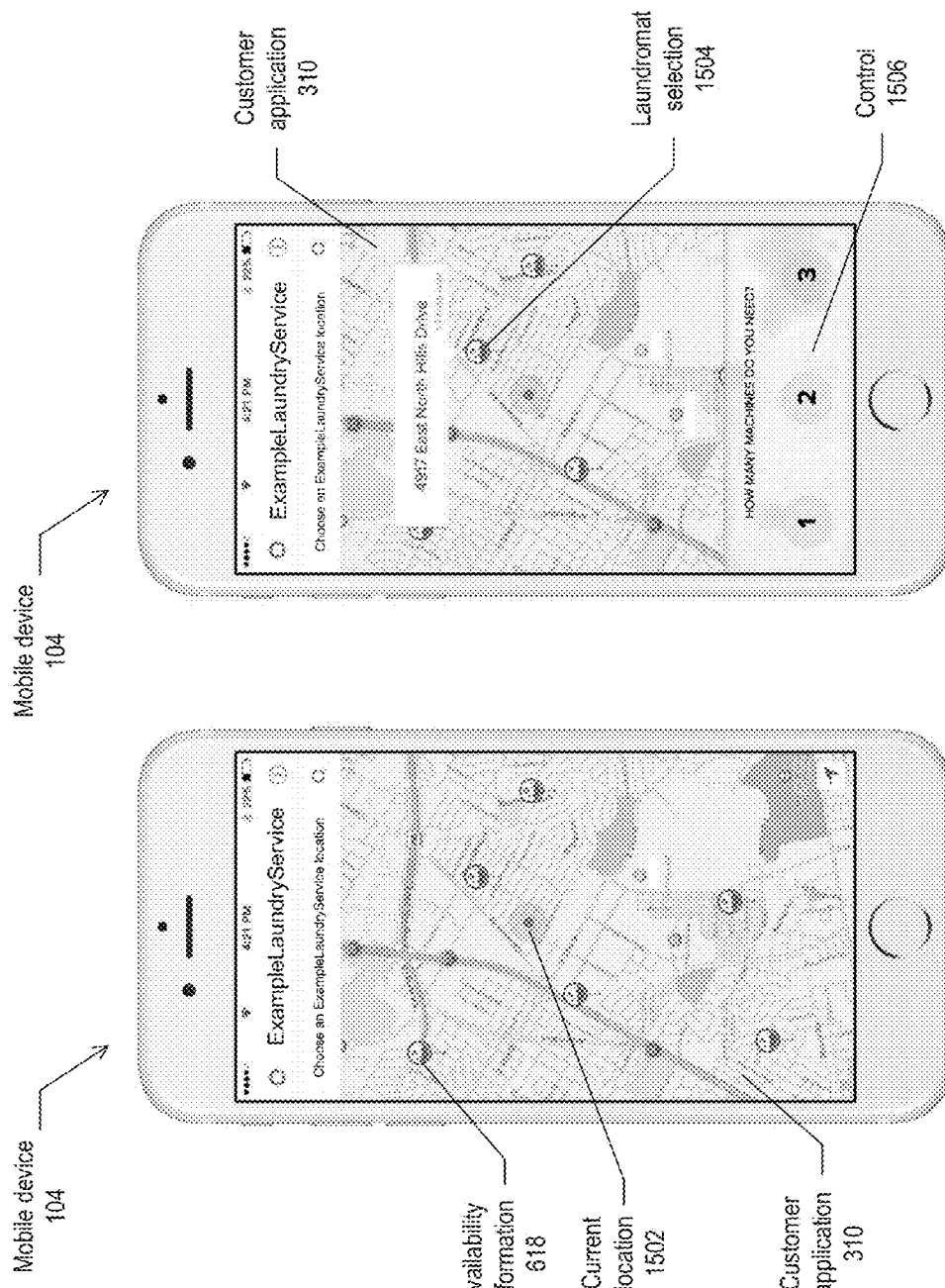

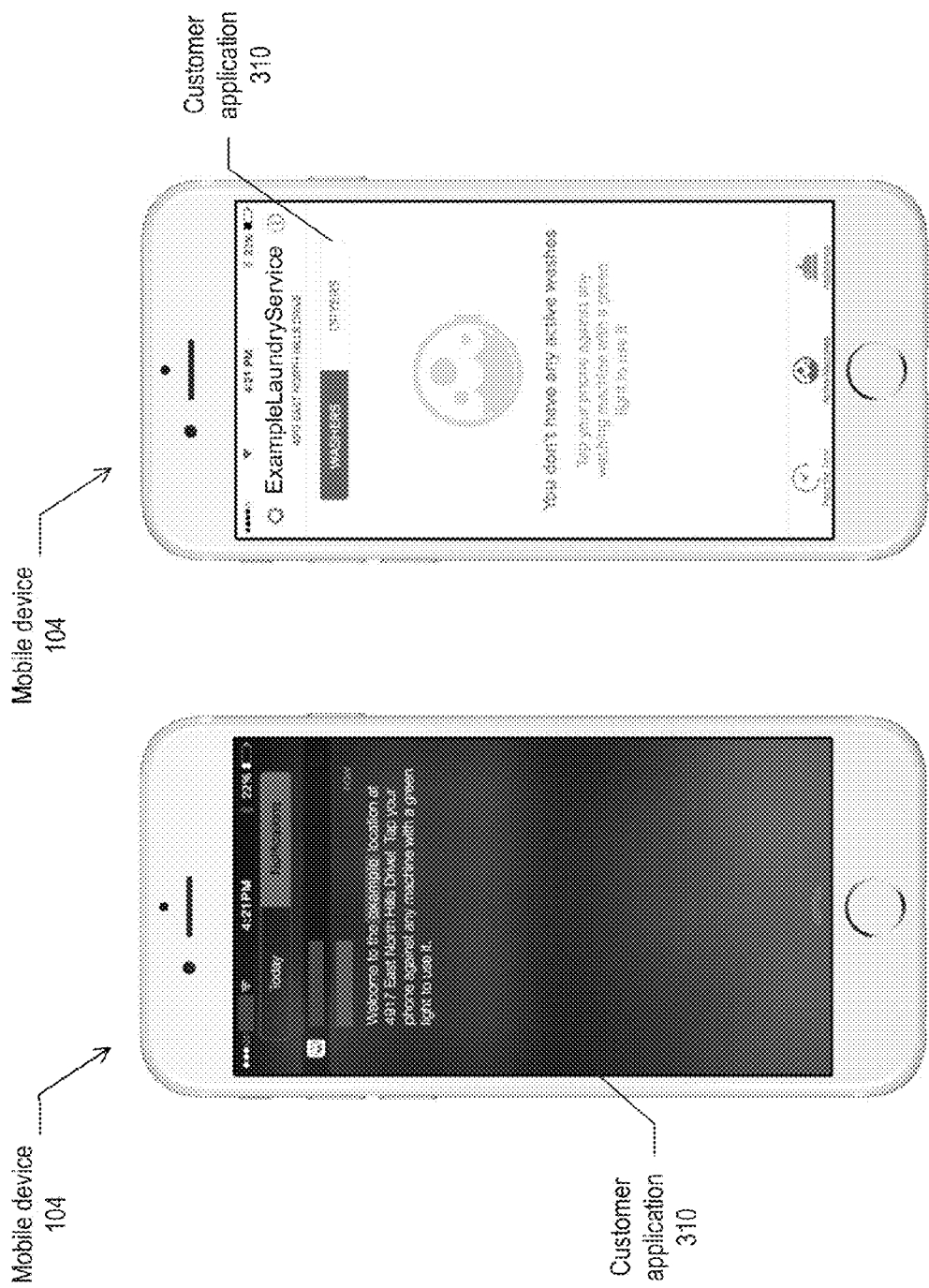

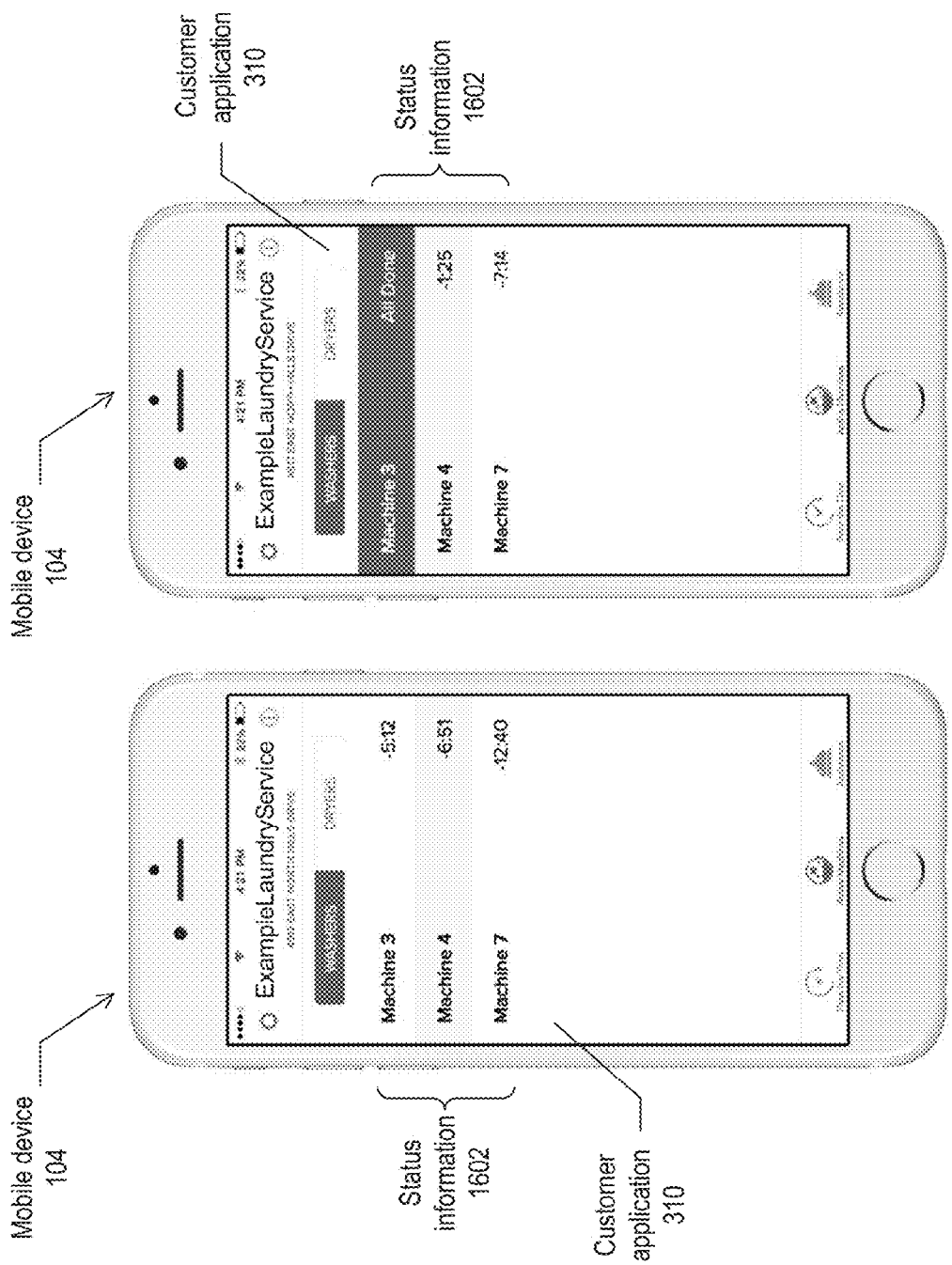

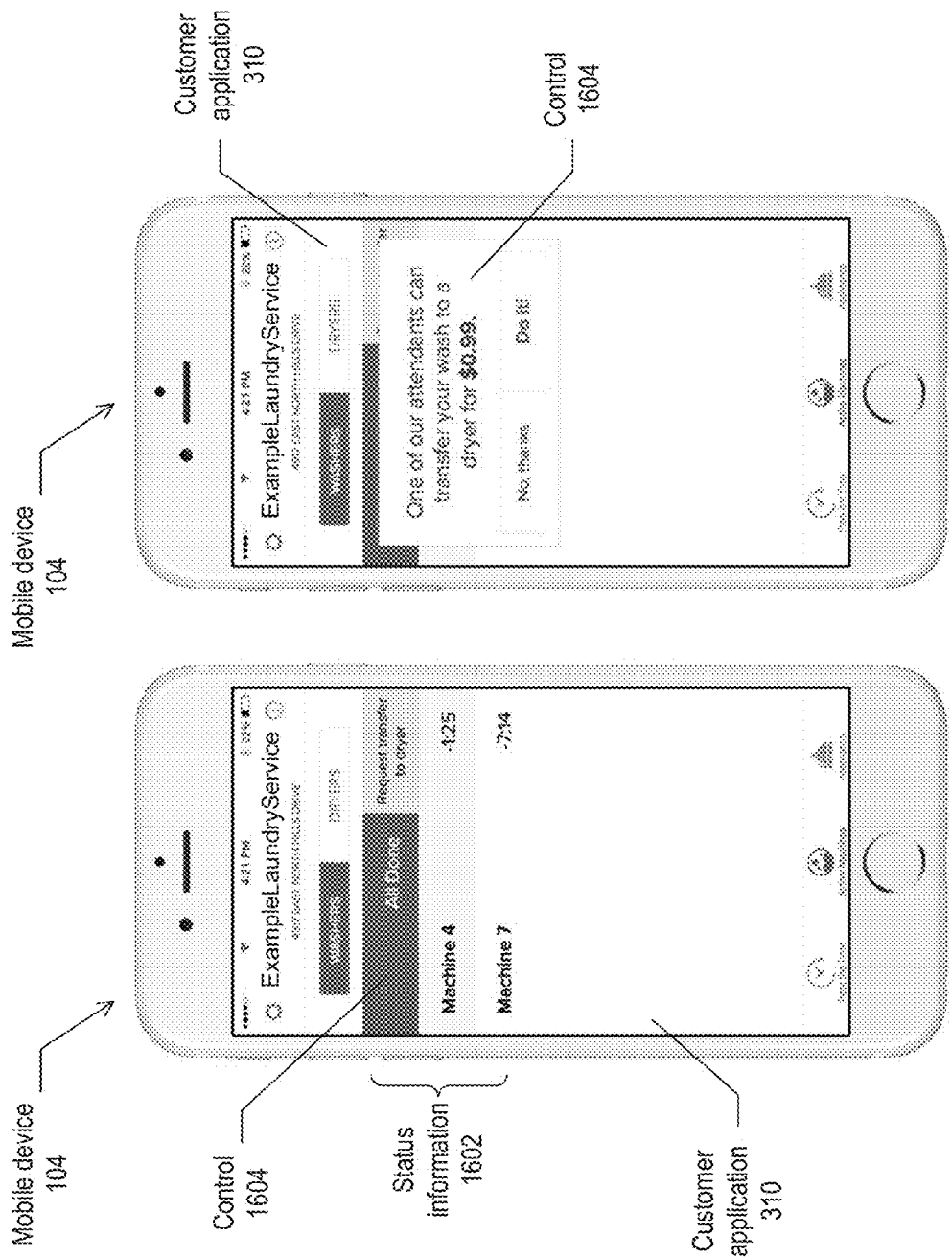

INTERFACING WITH LAUNDRY SERVICES AND FACILITIES

CROSS-REFERENCE TO RELATED APPLICATIONS

The present patent application claims priority to each of the following: U.S. Provisional Patent Application Ser. No. 62/220,174, filed on Sep. 17, 2015, titled "System for Commercial Laundry Services and Facilities," U.S. Provisional Patent Application Ser. No. 62/220,183, filed on Sep. 17, 2015, titled "Communication and Control System for Commercial Laundry Machines," and U.S. Provisional Patent Application Ser. No. 62/220,171, filed on Sep. 17, 2015, titled "Interfacing with Automated Commercial Laundry Services and Facilities." The entirety of each of these applications is incorporated by reference into the present application. The present patent application is also related to U.S. patent application Ser. No. 15/267,685, filed on Sep. 16, 2016, titled "Communication and Control System for Commercial Laundry Machines," and U.S. patent application Ser. No. 15/267,669, filed on Sep. 16, 2016, titled "System for Commercial Laundry Services and Facilities." The entirety of each of these applications is incorporated by reference into the present application.

BACKGROUND

Traditionally, commercial laundry businesses such as laundromats operate as cash-only businesses in which patrons use coins or tokens to feed into washers or dryers. This business model is not user-friendly, given the potentially large number of coins or tokens that may be required to enable a customer to wash and dry one or more loads of laundry. Some laundromats have attempted to eliminate the need for coins or tokens by providing value cards which may be purchased by customers. A customer may purchase a value card of a certain monetary value. To operate a washer or dryer, the customer may insert the value card into a reader attached to the washer or dryer, and the reader may deduct monetary value from the card and enable operation of the washer or dryer. However, this business model is also not user-friendly, given that it may require the user to carry monetary value on a card, thus rendering such monetary value unavailable to be spent by the user for other purposes. Moreover, many customers may not feel safe in a traditional laundromat given its nature as a publicly accessible facility that may not be staffed by employees at all hours of the day.

SUMMARY

Implementations of the present disclosure are generally directed to managing and controlling laundry machines to provide a laundry service. More specifically, implementations are directed to controlling laundry machine(s) through the use of remote signals that are sent based at least in part on a detected proximity of a mobile computing device to the laundry machine(s).

In general, innovative aspects of the subject matter described in this specification can be embodied in methods that include actions of: receiving a beacon signal detected using a wireless network interface of a mobile computing device, a beacon signal emitted from a laundry machine, the beacon signal identifying the laundry machine; and determining, based at least partly on the beacon signal, that the mobile computing device is within a threshold distance of the laundry machine, and in response, sending a request for use of the laundry machine during a period of time.

Implementations can optionally include one or more of the following features: the request is sent to request use of the laundry machine for the period of time corresponding to at least one laundry cycle of the laundry machine; determining that the mobile computing device is within the threshold distance of the laundry machine is based at least partly on a received signal level of the beacon signal being at least a threshold level corresponding to the threshold distance; the actions further include receiving using the wireless network interface of the mobile computing device, a plurality of beacon signals that includes the beacon signal, the plurality of beacon signals emitted from a plurality of laundry machines; the actions further include identifying the beacon signal from the laundry machine that is within the threshold distance of the mobile computing device, based on the beacon signal exhibiting a received signal level higher than other received signal levels of other beacon signals emitted from other laundry machines, and further based on the received signal level of the beacon signal being at least a threshold level corresponding to the threshold distance; the request is communicated from the mobile computing device to at least one management computing device; the request causes the at least one management computing device to communicate at least one control signal from the at least one management computing device to the laundry machine; the at least one control signal causes the laundry machine to be useable during the period of time; the beacon signal is at least partly compliant with a version of a Bluetooth Low Energy standard; the actions further include receiving an indication that the period of time has ended; the actions further include presenting, through a user interface (UI) on the mobile computing device, the indication that the period of time has ended; the actions further include detecting a command entered through the UI, the command indicating an additional period of time for use of the laundry machine; the actions further include communicating a service request to request use of the laundry machine during the additional period of time; the actions further include providing, through a user interface (UI) on the mobile computing device, a payment corresponding to the period of time during which the laundry machine is used; the actions further include determining a location of the mobile computing device; the actions further include presenting, through a user interface (UI) on the mobile computing device, location information for one or more laundromats in proximity to the mobile computing device; the actions further include detecting a selection through the UI indicating a laundromat of the one or more laundromats; and/or the actions further include sending a reservation request to request a reservation of one or more laundry machines in the laundromat.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and improvements over traditional systems. By providing a laundry service in which laundry machine(s) are reserved for particular user(s) and made available for use based on the proximity of the particular user(s) to the laundry machine(s), implementations enable more the efficient use and allocation of laundry machines in various locations, and avoid the requirement that a large number of excess machines be present in a laundry facility in order to support expected customer usage. In particular, by tracking usage patterns for laundry machine(s) at various locations, implementations may predict future usage and determine an appropriate number of machines to be placed at various locations. Moreover, because machine(s) may also be activated only when needed based on received reservations and/or the presence (e.g., at the laundromat or other location of machine(s)) of particular user(s) who intend to use the machine(s), implementations provide a laundry service that consumes less power and makes more efficient use of laundry machines compared to traditional laundry services.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 14A-D depict an example user interface that may be employed to interact with a laundry service in accordance with implementations of the present disclosure.

FIGS. 15A-F depict an example user interface that may be employed to interact with a laundry service in accordance with implementations of the present disclosure.

FIGS. 16A-F depict an example user interface that may be employed to interact with a laundry service in accordance with implementations of the present disclosure.

DETAILED DESCRIPTION

Figure 1:
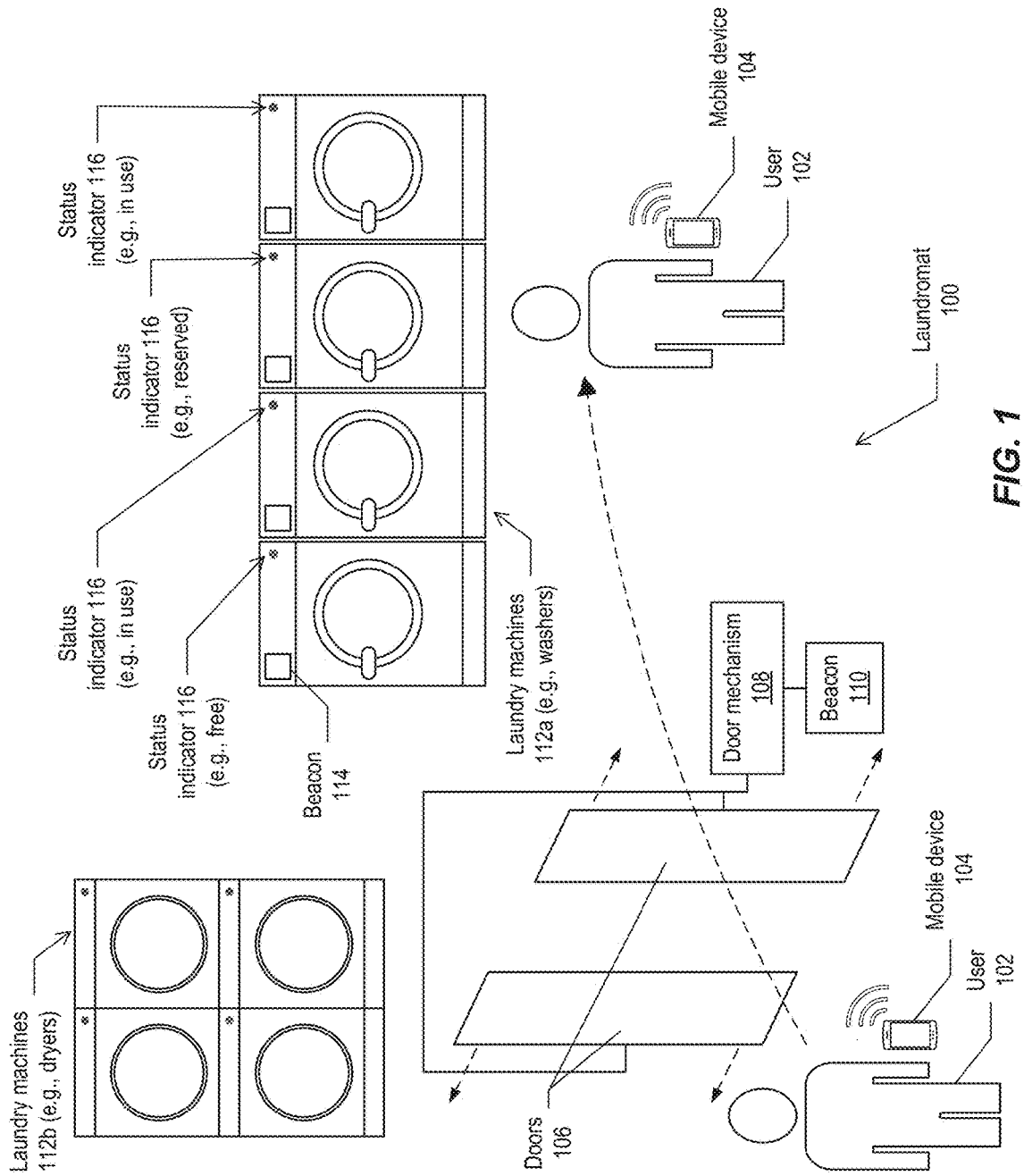
FIG. 1 depicts an example system for providing a laundry service in accordance with implementations of the present disclosure.

The present disclosure describes implementations for providing a laundry service. One or more management server devices may generate and provide content that is presented in a user interface (UI) on a user device such as a mobile computing device. For example, the management server device(s) may communicate information to a user device, and such information may be presented within a customer application (e.g., a mobile app) executing on the user device. The customer application may enable a user to create a user account with the laundry service. The user may login to the laundry service, using the UI of the customer application, and request availability information describing one or more laundry machines (e.g., washers, dryers, and so forth) that are currently available for use at one or more laundromat facilities. The availability information may also indicate machine(s) which are currently unavailable, e.g., in use or reserved for use. In some implementations, the availability information may indicate currently available laundry machine(s) in proximity to the current location of the user, such as within a predetermined threshold distance (e.g., 10 miles) of the user's current location or the current location of the user device. The availability information may be presented in the UI of the customer application, in a map and/or other suitable UI element that indicates the locations of the laundromat(s) with currently available laundry machine(s).

The user may select a laundromat through the UI of the customer application, causing the customer application to send a reservation request to the management server device(s). The reservation request may indicate a number of laundry machines to be reserved at the user-selected laundromat. On receiving the reservation request, one or more management modules executing on the management server device(s) may reserve one or more available laundry machines in the user-selected laundromat for a predetermined period of time. Reserving the laundry machine(s) may include updating status information that indicates a current status (e.g., free, in use, or reserved) of the various laundry machines managed by the laundry service. Reserving the laundry machine(s) may also include sending one or more control signals that cause a status indicator on the reserved laundry machine(s) to (e.g., visually) indicate the status of the laundry machine(s) as reserved. In some cases, the control signal(s) may also cause the door of the laundry machine to lock until the machine is requested by a user with a reservation. In some implementations, the control signal(s) may cause the disabling of a control panel of the machine instead of locking the machine or in addition to locking the machine. Accordingly, the control signal(s) may cause the control panel of the machine to be disabled, locked, or otherwise unusable until the machine is requested by a user with a reservation. The management server device(s) may also send a reservation response to the user device to inform the user that the requested number of laundry machines have been reserved at the user-selected laundromat. In some implementations, the reservation may be valid for a predetermined period of time (e.g., 15 minutes) to allow the user sufficient time to reach the selected laundromat.

The laundromat may include any number of laundry machines, such as washers and dryers. In some implementations, each laundry machine may be configured to include a status indicator that indicates a current status of the laundry machine. In some implementations, the status indicator may indicate one of a plurality of statuses. Example statuses can include in use, reserved, or free. Implementations also support the use of more or fewer possible statuses for laundry machines. A status indicator may indicate that the laundry machine is in use, and currently being used to wash or dry laundry. A status indicator may indicate that the laundry machine is reserved, based on a previous reservation request from a user. A status indicator may indicate that the laundry machine is free, such that a user may employ the laundry machine for doing laundry. As used herein, a free status may indicate that a laundry machine is available. Free is not limited to describing machines that are useable without payment (e.g., free of charge). A status indicator may indicate the status visually or through other means (e.g., audio or haptic indications).

The user may select to use one or more laundry machines in the laundromat for which the status indicator(s) indicate a status of free, reserved, and/or otherwise available for use by the user. In some implementations, a laundry machine may be configured to include a transceiver that emits a beacon signal. In some cases, the transceiver may be configured to emit a beacon signal that conforms to a version of a wireless communication protocol. Example wireless communication protocols can include Bluetooth™, Bluetooth Low Energy™, a field communication (NFC) protocol, other radio frequency (RF) communications protocols, and so forth. The beacon signal may include an identifier of the particular laundry machine that emitted the beacon signal. The user may select a laundry machine to use by moving the user device into proximity with the transceiver, or beacon, of the laundry machine. The user device may detect the beacon signal through a wireless network interface of the user device and, based on the received signal level being at least a threshold level, the customer application may determine that the user device is within a threshold distance of the laundry machine. In some cases, this movement of the user device into proximity with the laundry machine may be described as a bump, and may include the user device coming into physical contact with the beacon of the laundry machine. In some cases, the user device may not touch the laundry machine but may be brought close enough (e.g., 1-2 inches) to enable the customer application to infer, based on the received signal level of the beacon signal, that the user has selected the laundry machine to use.

The wireless network interface of the user device may be a RF receiver, transmitter, and/or transceiver that is configured to receive and/or send communications over a wireless network using any suitable wireless communication protocol.

Although examples herein may describe using RF communications to determine proximity of the user device to the laundry machine, other techniques may also be employed. In some implementations, the machine may emit some other type of beacon signals such as an optical (e.g., visible light) indicator, infrared beacon, sound, and so forth. The user device may detect the emitted beacon signal and, based on detecting the signal, may determine that the user device is in proximity to the laundry machine.

Implementations may also employ other techniques to determine that the user is in proximity to the laundry machine and/or that the user has selected the particular laundry machine for use. For example, a laundry machine may display a numeric code, alphanumeric code, or other type of code. The code may be printed on a decal that is affixed to the laundry machine. In some implementations, the code is presented in a LED display or other type of display that is a component of the laundry machine or that is otherwise associated with the laundry machine. The user may enter the code into the UI of the customer application to indicate the user's request to use the machine. The code may be presented on the laundry machine or in proximity to the laundry machine to indicate that the code identifies or is otherwise associated with the laundry machine. The code may uniquely identify the laundry machine among the set of laundry machines in the laundromat or among the set of laundry machines managed by the laundry service.

In some implementations, the code may be a scannable code such as a one-dimensional barcode, two-dimensional (e.g., matrix) barcode, scannable alphanumeric code, and so forth. The code may be arranged according to any suitable format, such as a version of the Universal Product Code (UPC), the Quick Response (QR) code, and so forth. In such instances, the user may use their user device to capture an image of the code or otherwise scan the code, e.g., using a camera or other image capture component. The scannable code may be decoded to retrieve information that uniquely identifies the laundry machine. The customer application may send a request to use the machine, and the request may include the machine's code that was entered into the user application and/or scanned. The scannable code may be presented on the laundry machine or in proximity to the laundry machine to indicate that the scannable code is particularly associated with the laundry machine. The information encoded in the scannable code may uniquely identify the laundry machine among the set of laundry machines in the laundromat or among the set of laundry machines managed by the laundry service.

In response to determining that the user device has been brought into proximity with the laundry machine, the customer application may send a machine request to the management server device(s) to request use of the laundry machine. The machine request may be sent over a wide area network (WAN) such as the internet. The machine request may include the identifier of the particular laundry machine. On receiving the machine request, the management module(s) executing on the management server device(s) may determine whether the laundry machine is available for use based on status information indicating that the status of the laundry machine is free or reserved. If the laundry machine is available, the management server device(s) may send one or more control signals to a network location (e.g., network address) of the laundry machine. The control signal(s) may instruct the laundry machine to alter its operational state to enable use of the laundry machine for a period of time. The period of time may correspond to a wash cycle if the laundry machine is a washer, for example. The period of time may correspond to one or more increments of drying time (e.g., 15 minute increments), if the laundry machine is a dryer, for example.

In some implementations, the user may specify one or more payment method(s) through the customer application. The payment method(s) may include, but are not limited to, one or more of a credit card, a bank account, a phone service account, a cryptographic currency account (e.g., Bitcoin™), or an online payment processing service account (e.g., PayPal™). In exchange for use of the laundry machine(s), the user may authorize payment to be made to the laundry service using the specified payment method(s). In this way, implementations may provide a laundry service that does not require the user to carry large numbers of coins or to carry a large balance on a value card, providing a more convenient, secure, and positive user experience than traditional laundromats.

In some implementations, access to the laundromat may be limited to those individuals who have a reservation or are registered customers of the laundry service. For example, the customer application may cause the user device to send an access request when the user device is in proximity to doors of the laundromat, and the access request may cause the management module(s) to instruct the doors to open, if the user is authorized to access the laundromat. In this manner, implementations provide a laundromat environment in which customers may feel safer than in a traditional (e.g., publicly accessible, unstaffed, and unmonitored) laundromat.

As used herein, laundry may describe any number of items of clothing of any type, including but not limited to pants, shirts, dresses, skirts, kilts, trousers, shorts, belts, suspenders, socks, hosiery, undergarments, diapers, bibs, shirts, blouses, gloves, hats, coats, jackets, ties, scarves, swimsuits, uniforms, costumes, unitards, leotards, and so forth. Laundry may include other items that are not worn, such as towels, washcloths, linens, rags, bedsheets, blankets, comforters, quilts, flags, tarps, and so forth. Laundry may include any number of items of any size, and may be at least partly composed of cloth of any type.

As used herein, a laundry machine may describe any type of apparatus associated with the washing, drying, or other handling of laundry. Although examples herein may describe a laundry machine as a washer or a dryer, implementations are not so limited. Laundry machines may also include, but are not limited to, pressing or ironing apparatuses, dry cleaning machines, steam cleaning machines, laundry folding machines, fumigation machines, and so forth. Laundry machines may also include any type of apparatus or object that facilitates manual handling of laundry, such as wash basins or washboards to manually wash laundry, clotheslines, racks, hooks, or rods to manually hang laundry to dry, ironing boards or irons to press laundry, and so forth. Laundry machines may also include vending machines that dispense (e.g., for free or for a charge) items used in doing laundry, such as detergent, fabric softeners, stain removers, bleach, detergent additives, and so forth.

As used herein, doing laundry may describe using a laundry machine to process laundry in any way. For example, and without limitation, doing laundry may include using a washer to wash laundry or using a dryer to dry laundry.

As used herein, a user may describe an individual person or multiple people.

As used herein, a laundromat may describe any facility that includes any number of laundry machines. A laundromat may be housed in a building or any portion of a building, and may include any number of rooms that are at least partly enclosed. A laundromat may also be an area of any size that includes any number of laundry machines in an indoor or outdoor environment.

As used herein, a signal may describe a wireless signal that is transmitted via electromagnetic (EM) waves of any type, including but not limited to a radio frequency signal, an infrared frequency signal, a microwave frequency signal, or a signal having a frequency in the visible portion of the EM spectrum. A signal may also be transmitted via sound waves, pressure waves, or via any other wireless mechanism. A signal may also describe an electrical signal, or other type of signal, that is transmitted over one or more wires. A beacon may describe any device or component, such as a transceiver or a transmitter, that is configured to send a signal.

As used herein, payment may describe the transfer of value from one party to another party. Such value may be described in units of any type of currency. Payment may also describe a transfer of any type of goods or services from one party to another party, as in a payment-in-kind, trade, service exchange, or barter arrangement. Payment may include the present (e.g., substantially immediate) transfer of value between parties. Payment may also include a promise of value to be transferred in the future, or the rescinding of a previously made promise to transfer value.

As used herein, a module may describe software, such as firmware, that is executable on at least one computing device. A module may include any number of applications, processes, programs, libraries, interfaces, threads, application programming interfaces (APIs), scripts, batch files, classes, objects, executable files, routines, subroutines, firmware modules, or other types of executable software.

FIG. 1 depicts an example system for providing a laundry service in accordance with implementations such as those of the present disclosure. As shown in FIG. 1, the system may operate with respect to a laundromat 100. The laundromat 100 may include any number of laundry machines 112. In the example shown, the laundromat 100 includes laundry machines 112a that are washers and laundry machines 112b that are dryers. Implementations may also operate with respect to laundromats 100 that include washers but no dryers, or that include dryers but no washers. The laundromat 100 may also include other types of laundry machines 112, without limitation. The laundromat 100 may include one or more sets of doors 106 that provide ingress to, and egress from, the laundromat 100.

A user 102 may approach the doors 106 of the laundromat 100, carrying a computing device such as a mobile device 104. The mobile device 104 may be any type of computing device, including but not limited to a smartphone, tablet computer, laptop computer, electronic book reader, wearable computer (e.g., watch, glasses, etc.), implanted computer, vehicle computer (e.g., automotive computer), and so forth. The mobile device 104 may execute a customer application that is configured to interact with management server device(s) that manage the laundry service. In some cases, prior to visiting the laundromat 100, the user 102 may have employed the customer application on the mobile device 104 to sign up as a customer of the laundry service. In some cases, the user 102 may have employed a different application (e.g., executing on a desktop computer) to sign up as a customer of the laundry service. The user 102 may have logged into the laundry service, using the customer application executing on the mobile device 104, prior to approaching the doors 106 of the laundromat 100.

In some implementations, on reaching the laundromat 100, the user 102 may employ the customer application executing on the mobile device 104 to gain access to the laundromat 100. For example, the laundromat 100 may include a beacon 110, e.g., a transceiver device, arranged in proximity to the doors 106 of the laundromat 100. The beacon 110 may emit a wireless beacon signal. In some implementations, the beacon signal may comply with a wireless communication protocol. Example wireless communication protocols can include any appropriate version of the Bluetooth™ wireless technology standard managed by the Bluetooth Special Interest Group (SIG) and previously standardized by the Institute of Electrical and Electronics Engineers (IEEE) in IEEE 802.15.1. In some implementations, the beacon signal may comply with any appropriate version of the Bluetooth Low Energy™ standard managed by the Bluetooth SIG. Bluetooth Low Energy™, marketed as Bluetooth Smart™, enables communications over a similar range as Bluetooth™ but with lower power consumption. Both the Bluetooth™ and Bluetooth Low Energy™ standards are described in versions 4.0 and later of the Bluetooth Core Specification promulgated by the Bluetooth SIG. Implementations also support the use of any NFC protocol, or other wireless communication protocols for the beacon signal. As described above, implementations may employ other types of beacon signals, such as visible light signals, infrared signals, and so forth. Implementations may also employ optical methods of proximity detection such as a numeric and/or alphanumeric code affixed to the machine, a scannable (e.g., QR) code, and so forth, as described above.

Based on the detection of the beacon signal by a wireless network interface of the mobile device 104, the customer application may determine that the mobile device 104 is within a threshold distance of the doors 106. For example, the customer application may infer that the mobile device 104 is within a threshold distance of the doors 106 based at least in part on a received signal level (e.g., signal strength) of the beacon signal. In response to the detection of the beacon signal, the mobile device 104 may send an access request to management server device(s) (not shown in FIG. 1) executing management module(s) that perform operations to provide the laundry service. Such management server device(s) may be physically located at the laundromat 100, or may be at a location that is geographically remote from the laundromat 100. Based on a determination that the user 102 is authorized to access the laundromat 100, the management server device(s) may send a control signal to instruct a door mechanism 108 to cause the doors 106 to open and admit the user 102. In some implementations, the door mechanism 108 may include a network interface to enable the control signal to be sent from the management server device(s) to the door mechanism 108. In some implementations, the access request may be sent to the management server device(s) without any interaction of the user 102 with the UI of the customer application, to enable access even when the user's hands are full carrying laundry. In some cases, when an attendant is staffing the laundromat 100, the doors 106 may open without receiving the control signal described above. Controlling user access to the laundromat is described further with reference to FIG. 8.

As shown in FIG. 1, the laundromat 100 may include any number of laundry machines 112 such as washers and dryers. In some implementations, one or more of the laundry machines 112 may include a status indicator 116 indicating a current status of the laundry machine 112, such as whether the laundry machine 112 is free, in use, or reserved. In some implementations, the status indicator 116 may indicate status using a visible mechanism. For example, the status indicator 116 may include a light-emitting diode (LED) such as a multi-color LED. The LED may emit different colors of light corresponding to possible statuses. For example, the LED may emit green light to indicate that the laundry machine 112 is free, red light to indicate that the laundry machine is in use, and blue light to indicate that the laundry machine 112 is reserved. Implementations also support the use of other types of status indicators 116, such as status indicators 116 that visually indicate status using displayed symbols, words, and so forth. In some cases, a status indicator 116 may include a mechanism such that different positions or movements of the mechanism may indicate different statuses. Implementations also support the use of status indicators 116 that indicate status using non-visual methods. For example, a status indicator 116 may emit different audible sounds to indicate different statuses. As another example, a status indicator 116 may perform different vibrations, motions, or other haptic outputs to indicate different statuses.

Based on the indicated statuses of the various laundry machines 112, the user 102 may select one or more laundry machines 112 to use. The user's selection of laundry machine(s) 112 for use may be based, at least in part, on whether the user 102 previously requested a reservation of laundry machine(s) 112. For example, if the user 102 previously requested a reservation of one or more laundry machines 112 in the laundromat 100, the user 102 may be allowed to use laundry machine(s) 112 that have a status of reserved or free. If the user 102 came to the laundromat 100 without having previously requested a reservation, the user 102 may be allowed to use laundry machine(s) 112 that have a status of free. In some implementations, the customer application executing on the user device 104 may present information describing the location(s) of available laundry machine(s) 112 in the laundromat 100. Such information may be presented in a schematic or map of the laundromat 100, or any other type of way-finding information. The user 102 may approach the laundry machine(s) 112 and request to use the laundry machine(s) 112 by moving (e.g., bumping) the mobile device 104 into proximity with the beacon 114 of each selected laundry machine 112, as described further with reference to FIG. 2.

Figure 2:
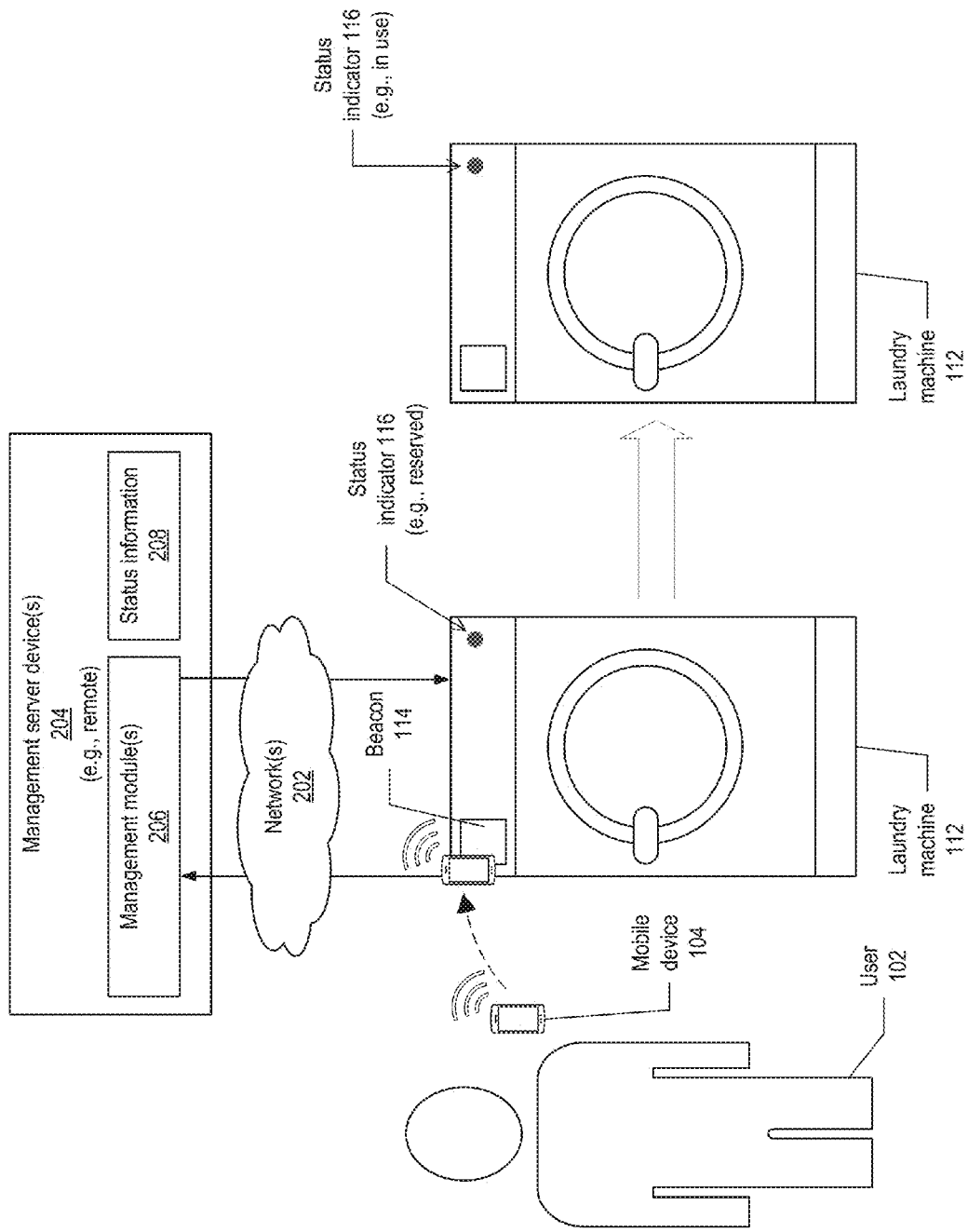
FIG. 2 depicts an example system for providing a laundry service in accordance with implementations of the present disclosure.

FIG. 2 depicts an example system for providing a laundry service in accordance with implementations such as those of the present disclosure. As shown in the example of FIG. 2, the user 102 may select to use a laundry machine 112 by approaching the laundry machine 112 and moving the mobile device 104 into proximity with the beacon 114 of the laundry machine 112. As described above, the beacon 114 may include a wireless transceiver that emits a beacon signal conforming to a version of a wireless communication protocol, such as a version of Bluetooth™ or Bluetooth Low Energy™, or any NFC protocol. The beacon signal may include an identifier of the particular laundry machine 112 that emitted the beacon signal. In some implementations, the identifier included in the beacon signal may be encrypted and may change periodically, to prevent someone from spoofing the laundry machine(s) 112 and generating erroneous charges.

Although FIG. 2 illustrates implementations in which the user moves their mobile device 104 into proximity with the beacon 114 to select the laundry machine 112, implementations are not limited to this example. As described above, in some implementations the machine may present a numeric or alphanumeric code (e.g., in a LED display or affixed decal) and he user may enter the code into the UI of the customer application to select the machine 112. In some implementations, the machine may present a scannable code, such as a 1-dimensional or 2-dimensional (e.g., matrix) barcode, scannable alphanumeric text, scannable symbol, and so forth. The user may select the machine by scanning the code using an image capture component of the mobile device 104.

A wireless network interface of the mobile device 104 may detect the beacon signal and, based on the received signal level being at least a threshold level, the customer application may determine that the mobile device 104 is within a threshold distance of the laundry machine 112. The moving of the mobile device 104 into proximity with the beacon 114 may be described as a bump, and may or may not include physical contact between the mobile device 104 and the laundry machine 112. Accordingly, a bump may be a touch of the mobile device 104 to a portion of the laundry machine 112, and a bump may also include a movement that brings the mobile device 104 into proximity (e.g., 1-2 inches) with the laundry machine 112 without touching the laundry machine 112.

In some implementations, if the customer application detects that the mobile device 104, based on a satellite-based navigation system (e.g., GPS) or other location information, and if the customer application determines that Bluetooth or Bluetooth Low Energy communications are not currently enabled on the mobile device 104, the customer application may prompt the user to activate the appropriate transceiver to communicate via Bluetooth, Bluetooth Low Energy, or other protocols. In cases where the OS of the mobile device 104 is configured to activate a transceiver automatically, the customer application may send a request to the OS to cause activation of the transceiver for Bluetooth or Bluetooth Low Energy communications.

In response to determining that the mobile device 104 has been brought into proximity with the laundry machine 112, the customer application may send a machine request to the one or more management server devices 204 to request use of the laundry machine 112. The management server device(s) 204 may include any number and any type of computing device. In some cases, the management server device(s) 204 may be physically located in the laundromat 100. In some cases, the management server device(s) 204 may be remote from the laundromat 100, located at one or more geographically different locations than the laundromat 100. The machine request may be sent to the management server device(s) 204 over network(s) 202. The network(s) 202 may include wired or wireless network(s), and may include any number of WANs (e.g., the internet). The network(s) 202 may also include any number of local area networks (LANs). In some implementations, the machine request may include the identifier of the particular laundry machine 112 that the user 102 is requesting to use.

The management server device(s) 204 may execute one or more management modules 206. The management module(s) 206 may receive the machine request. On receiving the machine request, the management module(s) 206 may determine whether the laundry machine 112 is available for use based on status information 208. The status information 208 may describe the current status of any number of laundry machines 112 associated with the laundry service. If the status information 208 indicates that the laundry machine 112 is free, the machine request may be approved. If the status information 208 indicates that the laundry machine 112 is reserved, the machine request may be approved if the user 102 previously submitted a reservation request which resulted in the reservation of laundry machine(s) 112.

If the management module(s) 206 approve the machine request, the management module(s) 206 may cause one or more control signals to be sent to a network address of the laundry machine 112. The control signal(s) may instruct the laundry machine 112 to alter its operational state to enable use of the laundry machine 112 for a period of time. The period of time may correspond to a wash cycle if the laundry machine 112 is a washer. The period of time may correspond to one or more increments of drying time (e.g., 15 minute increments), if the laundry machine 112 is a dryer. In some implementations, the sending of the control signal(s) to enable use of the laundry machine(s) 112 may be further based on a successful processing of a payment from the user 102 to the laundry service, using one or more payment methods previously set up by the user 102. The bump of the mobile device 104 at the laundry machine(s) 112, and subsequently enabling use of the laundry machine(s) 112, is further described with reference to FIGS. 9A, 9B, and 10. In some instances, payment may not be required and the use of the laundry machine(s) may be provided for free (e.g., as a promotion), as part of a test (e.g., beta test), and so forth. In some instances, the attendant may use the attendant app to enable use of machine(s) without requiring the user payment. In some implementations, commands may be sent to the laundry machine 112 from the management server device(s) 204 and/or other remote devices, for diagnostics, testing, and/or other purposes.

Although examples herein describe placing the laundry machine 112 into a particular state based on a successful processing of a payment from the user 102 to the laundry service, implementations are not so limited. In some implementations, the laundry machine 112 may be in one of two states—enabled or disabled. A machine 112 may be disabled until it receives a control signal that enables the machine 112, and the control signal may be sent in response to a successful processing of a payment from the user 102 to the laundry service. Once the machine 112 is enabled, the user may operate the machine 112 by selecting cycles, temperatures, wash or dry time, and/or other operational parameters, and by starting and stopping the machine 112 as needed. In some implementations, the machine 112 may be enabled for a particular period of time in response to a particular payment. For example, the user may rent a machine 112 for two hours in exchange for a particular amount, and the machine 112 may be enabled for two hours in response to a successful processing of the payment.

Figure 3:
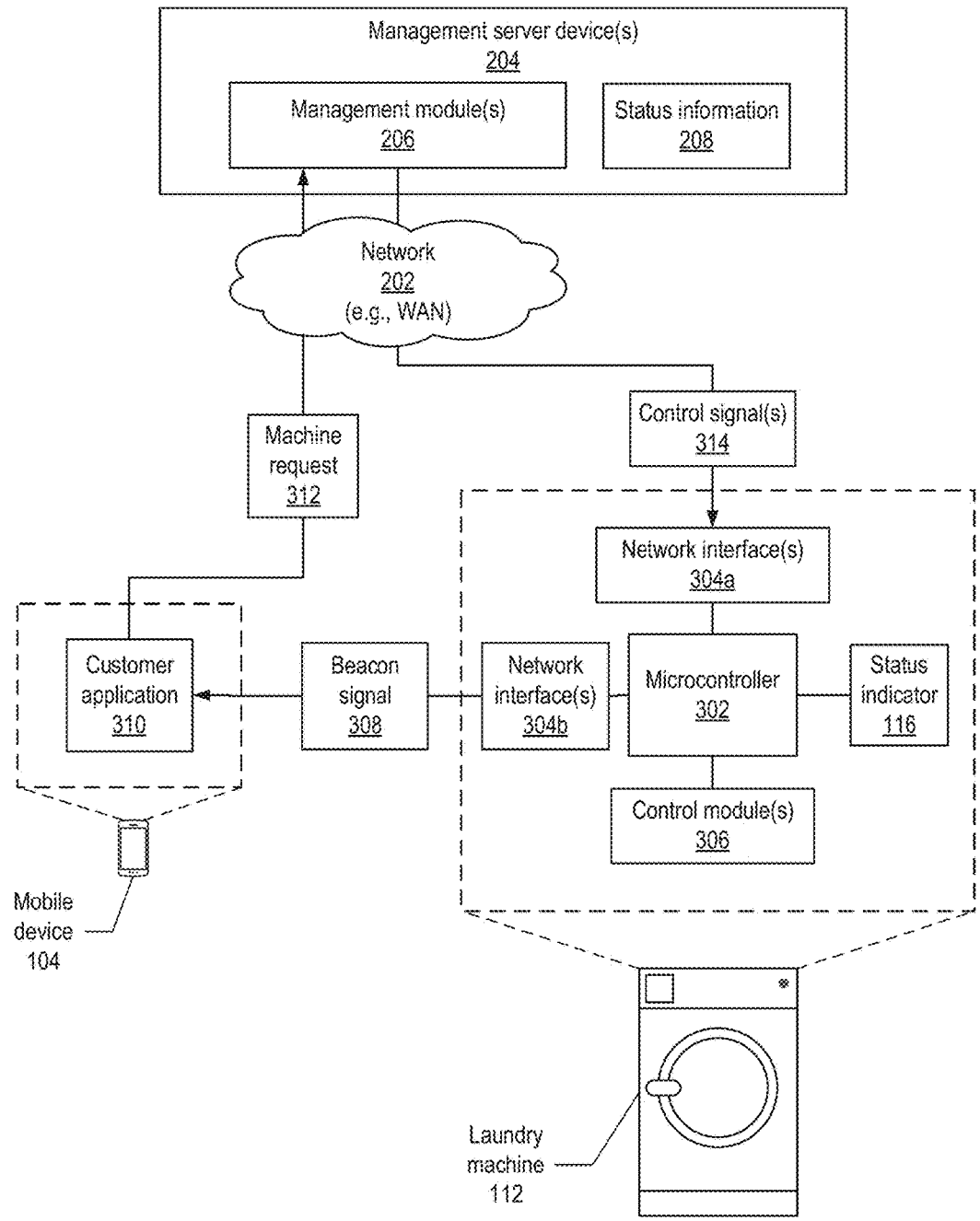
FIG. 3 depicts an example system for providing a laundry service in accordance with implementations of the present disclosure.

FIG. 3 depicts an example system for providing a laundry service in accordance with implementations such as those of the present disclosure. As shown in the example of FIG. 3, a laundry machine 112 may include a microcontroller 302, one or more network interfaces 304, one or more control modules 306, and a status indicator 116. The microcontroller 302 may be electronically and communicatively coupled to the network interface(s) 304, the control module(s) 306, and the status indicator 116 such that information may communicated between the microcontroller 302 and the other components. In some implementations, the microcontroller 302 may include one or more integrated circuits (ICs) such as a system-on-a-chip (SoC) or a system in package (SiP) (e.g., multiple chips). The microcontroller 302 may be incorporated into the laundry machine 112 to enable the laundry machine 112 to operate within the automated laundry service described herein.

The network interface(s) 304 may include hardware component(s) such as any type of network interface controller (NIC) or transceiver configured to enable the microcontroller 302 to communicate with other devices or components over one or more networks 202. The network interface(s) 304 may also include software component(s) such as network protocol stacks, network interface drivers, and so forth. In the example of FIG. 3, the network interface(s) 304 include one or more network interfaces 304a and one or more network interfaces 304b. The network interface(s) 304a may be configured to enable communication over a WAN such as the internet. The network interface(s) 304b may be configured to enable communication over a LAN. In some implementations, the network interface(s) 304b may enable communication over a wireless LAN (WLAN) using a communication protocol that complies with a version of Bluetooth™ or Bluetooth Low Energy™. Some implementations may support the use of other wireless communication protocols such as any NFC protocol.

The control module(s) 306 may control and monitor operations or conditions of the laundry machine 112 including but not limited to one or more of: the power state (e.g., on or off) of the laundry machine 112; the cycle of the laundry machine 112, such as whether the machine is currently in a wash cycle, spin cycle, dry cycle, soak cycle, and so forth; the presence of detergent, or the addition of detergent to the laundry; whether the door(s) of the laundry machine 112 are locked or unlocked; and so forth.

The mobile device 104 may be a user device operated by a current or potential customer of the laundry service. The mobile device 104 may be any type of computing device, including but not limited to a tablet computer, a notebook computer, or a smartphone. The mobile device 104 is described further with reference to FIG. 17.

In some implementations, the mobile device 104 or other user device may execute a customer application 310. The customer application 310 may be written or otherwise described using any programming language. In some cases, the customer application 310 may be a native application that is compiled, linked, or otherwise built from source code to generate machine-executable binary instructions configured to execute on the processor(s) and within the operating system (OS) of a computing device such as the mobile device 104. In some cases, the customer application 310 may be written in a programming language that compiles to an intermediate language (e.g., bytecodes) that is executable within a runtime application such as a Java™ Virtual Machine (JVM), C#™ runtime, or any other runtime, interpreter, virtual machine, or execution engine running on a computing device. In some cases, the customer application 310 may include any number of executable instructions in a scripting language or interpreted language, such as JavaScript™, ActiveScript™, VBScript™ Perl™, and so forth. In such cases, the customer application 310 may execute within a runtime, interpreter, virtual machine, scripting engine, or other execution container.

In some cases, the customer application 310 may be configured to execute, at least partly, in a web browser or other container for the presentation of web content, such as a WebView or UIWebView class. Accordingly, the customer application 310 may include dynamic scripting or programmatic elements described using any programming language, such as JavaScript™, ActiveScript™, VBScript™, Perl™, and so forth. Implementations support the use of any appropriate web browser to execute the customer application 310. Such a web browser may include, but is not limited to, one or more of the following: Mozilla Firefox™; Microsoft Internet Explorer™; Google Chrome™; Apple Safari™; Rockmelt™; and so forth. In cases where the customer application 310 is configured to be presented, at least partly, within a web browser or other container for the presentation of web content, the customer application 310 may include any number of web pages that are described at least in part using a markup language such as any version of Hypertext Markup Language (HTML), Dynamic HTML (DHTML), Extensible HTML (XHTML), Extensible Markup Language (XML), and so forth.

The customer application 310 may include a UI that enables the user 102 to interact with the customer application 310. Examples of the UI are described further with reference to FIGS. 14-17. The customer application 310 may be location sensitive and may present different information based on a current location of the user device 104. For example, if the user device 104 is currently in the laundromat 100, the customer application 310 may present a first set of UIs related to laundry loads in progress, additional service(s) that may be requested, available laundry machine(s) 112, games, advertisements, and surveys to pass the time, or other information. If the user device 104 is currently outside the laundromat 100, the customer application 310 may present a second set of UIs related to the user's reservation at a particular laundromat 100, current location relative to the laundromat 100, available laundry machine(s) 112 at various nearby laundromat(s) 100, or other information. In some implementations, the customer application 310 may determine whether the user device 104 is currently in the laundromat 100 based on detecting one or more beacon signals from laundry machine(s) 112, the door(s) 106, or other beacon signals.

The microcontroller 302 may cause the network interface(s) 304b to emit a beacon signal 308. In some implementations, the beacon signal 308 may be emitted within a particular frequency range such that a wireless network interface of the mobile device 104 is able to detect and receive the beacon signal 308. In some implementations, the beacon signal 308 may comply with a version of Bluetooth Low Energy™ or Bluetooth™, and the wireless network interface may be configured to receive and/or send signal that are compliant with a version of such protocols. The wireless network interface may also be configured to receive and send other suitable types of (e.g., radio frequency) communications. The beacon signal 308 may be emitted periodically to indicate the presence of the laundry machine 112. Accordingly, the network interface(s) 304b may be component(s) of the beacon 114. The beacon signal 308 may include an identifier that identifies the particular laundry machine 112 from which the beacon signal 308 is emitted. In some cases, the identifier may uniquely identify the laundry machine 112 among the plurality of laundry machines 112 managed by the management server device(s) 204 within the laundry service. In some cases, the identifier may uniquely identify the laundry machine 112 among the plurality of laundry machines 112 in a particular laundromat 100. The beacon signal 308 may also include other information regarding the laundry machine 112, such as the availability of the machine, the status (e.g., operational, non-operational, in use, idle, etc.) of the machine, metadata describing the machine (e.g., location, type, model, price, etc.), and so forth.

Based on receiving an indication of the received beacon signal 308, the customer application may determine that the mobile device 104 is within a threshold distance of the laundry machine 112. This determination is described further with references to FIGS. 9A, 9B, and 10, and may be described as a bump of the mobile device 104 with the laundry machine 112. A bump may include physical contact between the mobile device 104 and a portion (e.g., the beacon 114) of the laundry machine 112. In some cases, a bump may be detected if the mobile device 104 does not contact the laundry machine 112 but is within the threshold distance of the laundry machine 112, as indicated by the received signal level of the beacon signal 308 being at least a threshold level.

On determining that the mobile device 104 is within a threshold distance of the laundry machine 112, the customer application 310 may infer that the user 102 is selecting the laundry machine 112 for use. The customer application 310 may cause a machine request 312 to be communicated to the management server device(s) 204. In some implementations, the machine request 312 may be communicated to the management server device(s) 204 over a WAN such as the internet. The machine request 312 may include the identifier of the laundry machine 112. In some cases, the machine request 312 may include an indication of the laundromat 100 where the laundry machine 112 is located. The machine request 312 may be received by the management server device(s) 204 and accessed by management module(s) 206 executing on the management server device(s) 204.

The management module(s) 206 may access status information 208 stored on the management server device(s) 204 or elsewhere. The status information 208 may list, for each laundry machine 112 managed within the laundry service, a current status of the laundry machine 112. For example, the status information 208 may indicate that a laundry machine 112 is currently free, currently in use, or currently reserved for other user(s). If the user 102 previously reserved a laundry machine 112 at the laundromat 100, the machine request 312 may be approved by the management module(s) 206 if the current status of the user-selected laundry machine 112 is free or reserved. If the user 102 did not previously reserve a laundry machine 112 at the laundromat 100, the machine request 312 may be approved if the current status of the user-selected laundry machine 112 is free. If the current status of the user-selected laundry machine 112 is in use, the machine request 312 may be denied.

In some cases, the user 102 may login to the customer application 310 by entering one or more credentials such as a user name, password, and so forth. In some cases, the user 102 may be authenticated by the management module(s) 206 based on credential(s) provided with the machine request 312 or in a previously sent communication. The approval of the machine request 312 may be further based on whether the user 102 has been authenticated as an authorized user of the laundry service. In some implementations, the approval of the machine request 312 may also be contingent on the successful processing of a payment from the user 102 to the laundry service.

If the machine request 312 is denied, the management module(s) 206 may generate a message that is communicated for presentation on the customer application 310. The message may indicate that the machine request 312 for the particular laundry machine 112 has been denied, e.g., because the laundry machine 112 is already in use or reserved for other user(s). In that case, the user 102 may be instructed to bump a different laundry machine 112, such as a laundry machine 112 with an indicated status of free or reserved (e.g., if the user 102 has a reservation).

If the machine request 312 is approved, the management module(s) 206 may update the status information 208 to indicate, for the laundry machine 112, a current status of in use. The management module(s) 206 may generate one or more control signals 314 that are communicated to the laundry machine 112. In some implementations, the laundry machine 112 may have a network address such as an internet protocol (IP) address. The management module(s) 206 may determine the particular network address that is associated with the laundry machine identifier, and cause the control signal(s) 314 to be sent to the network address of the laundry machine 112. In some implementations, the management module(s) 206 may determine the network address based on address information stored in a table or other data structure. The address information may list, for each laundry machine 112, a network address of the laundry machine 112 in the form of an IP address or other address. In some implementations, the control signal(s) 314 may be sent to a (e.g., local) server device that is configured to manage the laundry machines 112 in the laundromat 100, and the (e.g., local) server device may forward the control signal(s) 314 to the laundry machine 112. In some implementations, the control signal(s) 314 may be communicated to the laundry machine 112 over a WAN (e.g., the internet) and may be received by the network interface(s) 304a.

The control signal(s) 314 may instruct the microcontroller 302 to alter an operational state of the laundry machine 112 from its previous state (e.g., free or reserved) to a current state (e.g., in use). The control signal(s) 314 may instruct the microcontroller to set the state of the machine 112 to any appropriate state, including but not limited to free, reserved, or in use. Altering the operational state may include sending an instruction to cause the status indicator 116 to indicate a status of in use. Altering the operational state may also include sending an instruction to the control module(s) 306 to cause the door of the laundry machine 112 to unlock, or to cause the control module(s) 306 to mechanically or electrically enable the laundry machine 112 to perform operations to process laundry. In some implementations, altering the operational state of the machine 112 may include enabling or disabling a control panel and/or one or more controls of the machine 112. The microcontroller 302 may send other instruction(s) to the control module(s) 306 to enable the use of the laundry machine 112. In some implementations, the control signal(s) 314 may cause the microcontroller 302 to enable use of the laundry machine 112 during a predetermined period of time. For example, in cases where the laundry machine 112 is a washer, the laundry machine 112 may be enabled for use during a wash cycle of the laundry machine 112. In cases where the laundry machine 112 is a dryer, the laundry machine 112 may be enabled for use during one or more increments of time (e.g., 15 minute increments) associated with the dryer.

In some implementations, the customer application 310 may determine whether a bumped laundry machine 112 is available for use. For example, the beacon signal 308 may include an identifier of the laundry machine 112 as well as an indication of the current status of the laundry machine 112. If the customer application 310 determines that the current status is in use, based on the beacon signal 308, the customer application 310 may present a notification indicating that the selected laundry machine 112 is currently in use. If the customer application 310 determines that the current status is reserved, and if the user 102 does not have a reservation at the laundromat 100, the customer application 310 may present a notification indicating that the selected laundry machine 112 is reserved for other user(s).

Figure 4:
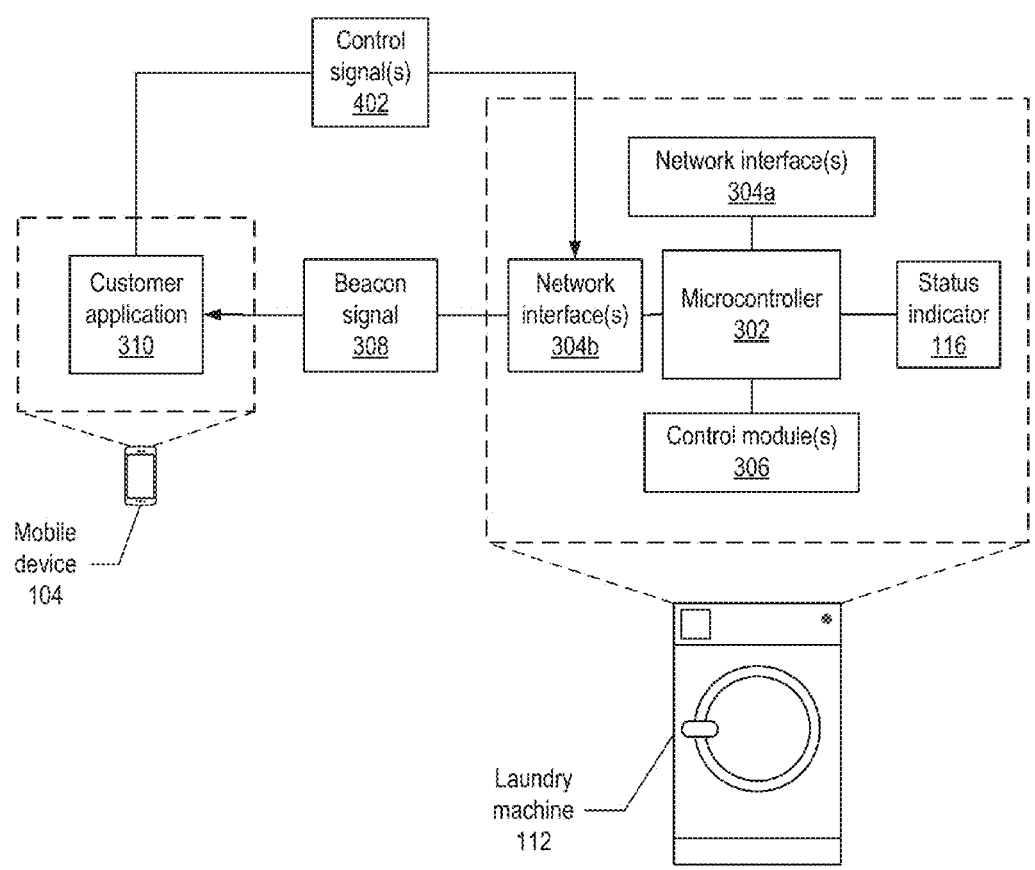
FIG. 4 depicts an example system for providing a laundry service in accordance with implementations of the present disclosure.

FIG. 4 depicts an example system for providing a laundry service in accordance with implementations of the present disclosure. FIG. 3 depicts an example system in which the management server device(s) 204 act as an intermediary between the user's mobile device 104 and the laundry machine 112. FIG. 4 depicts an example system in which the interaction between the mobile device 104 and the laundry machine 112 is substantially more direct and not intermediated by management server device(s) 204. In the example of FIG. 4, the laundry machine 112 may emit the beacon signal 308 which is detected at the customer application 310. On determining, based on the beacon signal 308, that the mobile device 104 is in proximity to the laundry machine 112, the mobile device 104 may establish a connection with the microcontroller 302 via the network interface(s) 304b. The customer application 310 may use the connection to send control signal(s) 402 to request the use of the laundry machine 112 during a predetermined period of time. In implementations that support this more direct (e.g., peer-to-peer) communication between the mobile device 104 and the laundry machine 112, the network interface(s) 304b may support communication via Bluetooth™ or another protocol that enables the communication of more data than Bluetooth Low Energy™. In the example of FIG. 4, the laundry machine 112 may not have a direct (e.g., WAN) connection to the management server device(s) 204, and may instead use the user device's network connection to indirectly communicate with the management server device(s) 204.

In some implementations, the microcontroller 302 depicted in FIGS. 3 and 4 may be a SoC, SiP, or other type of system that has been incorporated into the laundry machine 112 to enable the control of the laundry machine 112 from the management server device(s) 204 or the mobile device 104. The microcontroller 302 may be physically incorporated into the laundry machine 112. In some cases, the microcontroller 302 may be external to the laundry machine 112. The microcontroller 302 may interface with the control module(s) 306 via a serial port such as a Universal Serial Bus (USB) connection, a parallel port, an Ethernet connection, a ribbon cable (e.g., multi-wire planar cable), or any other type of wired or wireless interface that enables the transfer of information between the microcontroller 302 and the control module(s) 306. In some cases, the microcontroller 302 may interface with the control module(s) 306 using one or more of a general-purpose input/output (GPIO) connector, a universal asynchronous receiver/transmitter (UART), an inter-integrated circuit (i2c), or a serial peripheral interface (SPI). The control module(s) 306 may be separate with respect to the microcontroller 302, or may be at least partly incorporated into the microcontroller 302. In some implementations, the microcontroller 302 may be powered using the power provided to the laundry machine 112. In some implementations, the microcontroller 302 may be powered independently from the laundry machine 112.

In some implementations, the microcontroller 302 may be configured to enable use of the laundry machine 112 for an authorized user 102. In such cases, the user 102 may use the existing controls of the laundry machine 112 to do laundry after the microcontroller 302 has enabled its use. In some cases, the microcontroller 302 may be configured to have more extensive control of the operations of the laundry machine 112. In such cases, the user device 102 may effectively become the primary interface between the user 102 and the laundry machine 112, enabling the user 102 to control the operations of the laundry machine 112 with regard to cycle options, temperature, time of operation, cycle selection, water fill level, detergent addition, or other aspects. One or both of the user device 104 or the management module(s) 106 may store user preference information regarding the various options, to facilitate the user's subsequent use of a laundry machine 112.

Figure 5:
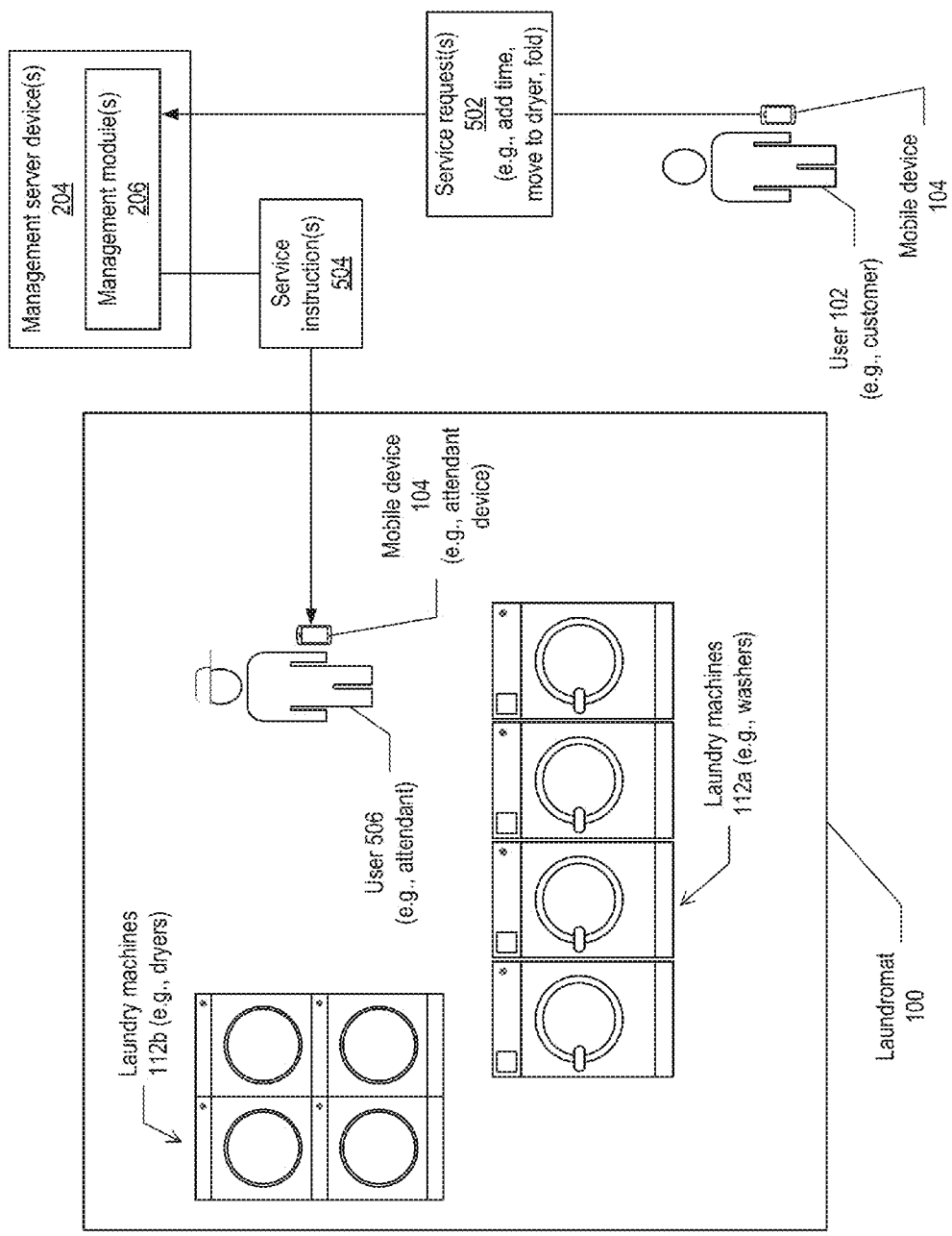
FIG. 5 depicts an example system for providing a laundry service in accordance with implementations of the present disclosure.

FIG. 5 depicts an example system for providing a laundry service in accordance with implementations such as those of the present disclosure. In some implementations, a user 102, such as a customer of the laundry service, may be presented with periodic updates regarding the progress of laundry in one or more laundry machines 112 of the laundromat 100. Such updates may be presented in the customer application 310, and may indicate the number of loads in progress, the laundry machine 112 being used for each load of laundry, and the amount of time left to process the load on each laundry machine 112. The customer application 310 may also present an indication when each load is complete. In some cases, the periodic updates of laundry status may be sent (e.g., peer-to-peer) from the laundry machine 112 to the user device 104 without using the management server device(s) 204 as an intermediary. In such cases, the updates may be sent to the user device 104 even after the user device 104 has been moved away from the laundry machine 112 (e.g., out of the threshold distance for bumping). In some cases, the periodic updates may be sent to the user device 104 from the management server device(s) 204 based on status information received, at the management server device(s) 204, from the laundry machine, or based on a known time period for the laundry cycle. In some implementations, the updates may be sent to the user device 104 from the management server device(s) 204 through an intermediary, such as through one or more server(s) that facilitate push messaging to devices that run a particular operating system such as a version of iOS™, Android™, and so forth.

The customer application 310 may be configured to enable the user 102 to send one or more service request(s) 502 to request additional service(s) to be performed with respect to the user's laundry. For example, the service request(s) 502 may request one or more of the following: addition of time to a laundry machine 112, such as more drying time or an additional wash cycle; addition of detergent, fabric softener, dryer sheet(s), or other items to a laundry machine 112; movement of laundry from one laundry machine 112 to another, such as moving laundry from a washer to a dryer and starting a dry cycle; removal of laundry from a laundry machine 112; folding of laundry; storage of laundry pending the return of the user 102; delivery of laundry to the user's home or other location, and so forth. Each of these additional services may be available to the user 102 for an additional payment, which may be processed by the management module(s) 206. In some cases, the laundry service may also provide an additional service to pick up laundry from the user 102. The user's laundry may then be done by an attendant and either delivered to the user 102 or held for pickup by the user 102.

The management module(s) 206 may access the service request(s) 502 received at the management server device(s) 204 and, if payment is processed successfully, the management module(s) 206 may generate one or more service instructions 504 that are sent to a mobile device 104 of a user 506. In some instances, payment may not be required and the services may be provided for free (e.g., as a promotion), as part of a test (e.g., beta test), and so forth. In some instances, the attendant may provide such services without requiring the user payment. The user 506 may be an attendant, e.g., employed by the laundry service, who is on site at the laundromat 100. The service instruction(s) 504 may instruct the user 506 to perform the additional service(s) requested in the service request(s) 502. In some implementations, the user 506 may be presented with the service instruction(s) 504 on an attendant application that executes on the attendant's mobile device 104. The attendant application may be a different application than the customer application 310, or may be a same application with a different set of exposed features. In performing the additional service(s) for the user 102, the attendant user 506 may act as a proxy for a customer user 102. The attendant application may be configured to perform operations including but not limited to the following: authenticate the attendant to the laundry service; present a current number of customers in the laundromat 100; present a status summary of the laundry machine(s) 112 in the laundromat 100; present additional information regarding the laundry machine(s) 112; process refunds to customers; present notification(s) of additional service(s) to be performed; present information regarding reservation(s) at the laundromat 100; send a message (e.g., text message) to a customer; or present a predicted level of activity in the laundromat 100 based on historical data, current reservation(s), and a current number of customers.

By enabling the user 102 to submit service request(s) 502 for additional service(s), implementations may provide a more positive and convenient customer experience for the user 102. For example, the user 102 may start one or more loads of laundry and leave the laundromat 100 to go to their home, their office, a store, a coffee shop, or elsewhere, and the user 102 may submit service request(s) 502 for further handling of their laundry while the user 102 is not present in the laundromat 100.

In some implementations, the attendant may use the attendant application executing on the attendant's mobile device 104 to perform actions that may not be permitted for a customer (e.g., user 102). For example, the attendant may be able to bump the mobile device 104 on a laundry machine 112 that is currently in use, and use the attendant application to stop the laundry machine 112, unlock and open the door of the laundry machine 112, and remove the laundry to move to another laundry machine 112. In cases where the door of the laundry machine 112 may automatically lock while a cycle is in progress, a customer may not be able to perform such actions. Accordingly, the attendant application may provide a wider range of privileges to the attendant than those provided to a customer.

Figure 6:
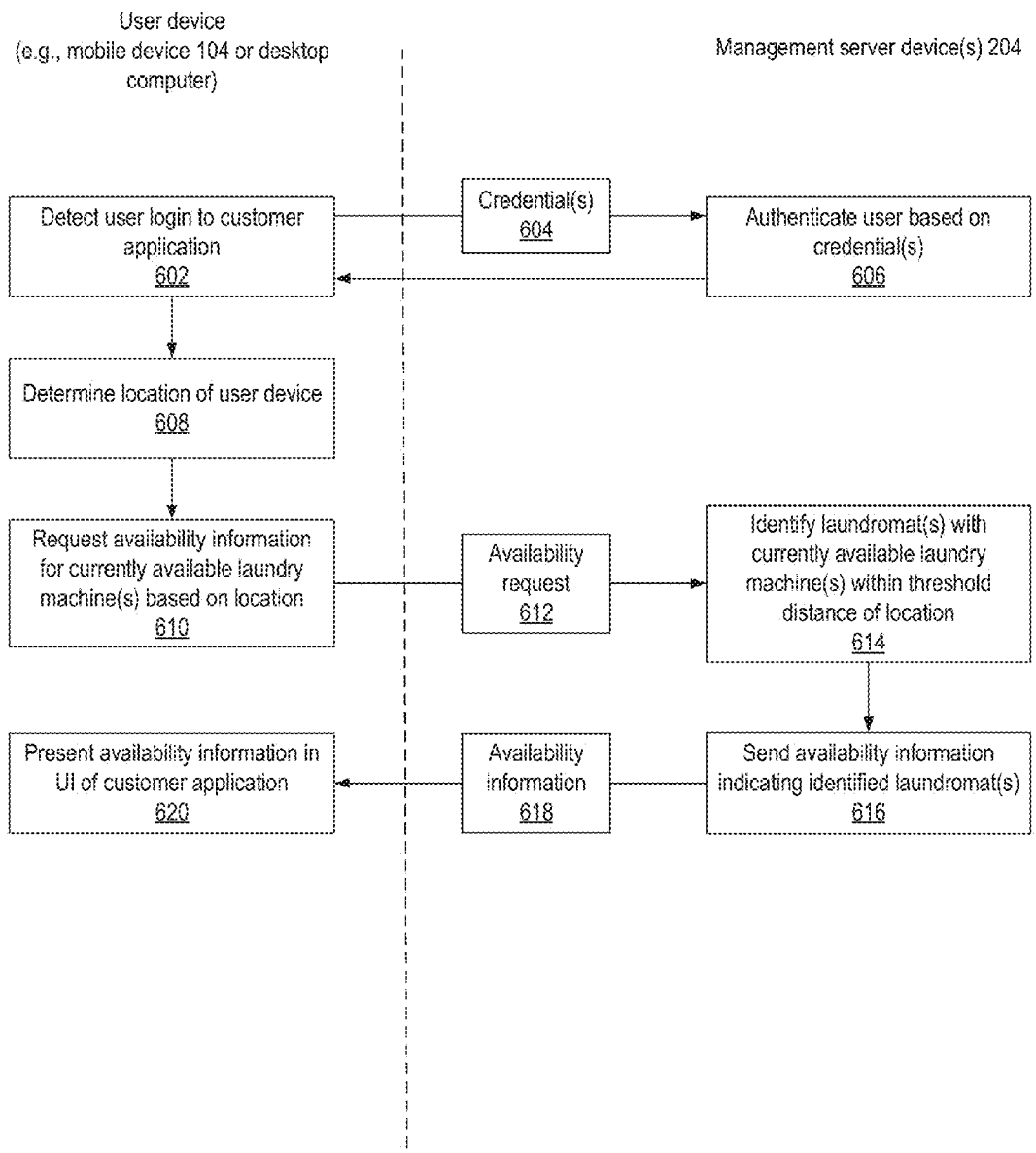
FIG. 6 depicts an example process that may be executed in accordance with implementations of the present disclosure.

FIG. 6 depicts an example process that may be executed in accordance with implementations such as those of the present disclosure. FIG. 6 describes an example process for presenting availability information that describes available laundry machine(s) 112 at laundromat(s) 100. Operations of the process may be performed by one or more of the customer application 310, other module(s) executing on the mobile device 104, the management module(s) 206, other module(s) executing on the management server device(s) 204, or other module(s) executing on other device(s).

The customer application 310, executing on a user device such as the mobile device 104 or a desktop computing device, may detect (602) an attempted login of the user 102 at the customer application 310. The user 102 may enter one or more credentials (604), such as a login, password, or other credentials, through the UI of the customer application 310. The customer application 310 may communicate the credential(s) 604 to the management module(s) 206 executing on the management server device(s) 204.

The management module(s) 206 may authenticate (606) the user 102 by comparing the credential(s) 604 to credential(s) previously provided by the user 102. The management module(s) 206 may send, to the user device, a result indicating the success or failure of authentication of the user 102. The operations for authenticating the user 102 may be performed by software executing on the management server device(s) 204 or the user device.

The customer application 310 may determine (608) a location of the user device. The location may be determined, using any technique, to any degree of specificity. For example, the user device may include location sensor(s), transceiver(s), other hardware component(s), or other software component(s) configured to determine the location using one or more of the following: an inertial navigation system, a dead-reckoning navigation system, a network positioning system, a radio position finding system, a satellite-based navigation system, an accelerometer system, a gyroscope system, and so forth. The satellite-based system may include one or more of a Global Positioning System (GPS) receiver, a Globalnaya Navigatsionnaya Sputnikovaya Sistema (GLONASS) receiver, a Galileo receiver, an Indian Regional Navigational Satellite System, and so forth. The location may also be determined through geolocation based on an IP address of the user device. In some cases, the location of the user device or the user 102 may be determined based on previously collected information describing the user device or the user 102, such as a previously specified address of the user 102.

The customer application 310 may request (610) availability information 618 by communicating an availability request 612 to the management module(s) 206. The availability request 612 may request availability information 618 describing one or more currently available laundry machines 112 at one or more laundromats 100.

The management module(s) 206 may identify (614) one or more laundromats 100 that include currently available laundry machine(s) 112, the laundromat(s) being within a predetermined threshold distance of the location of the user device. In some implementations, this identification may be based on the status information 208 that indicates a current status (e.g., free, in use, or reserved) of laundry machine(s) 112 managed within the laundry service. For example, the management module(s) 206 may identify those laundromat(s) 100 that are located within 10 miles of the user device and that currently have available laundry machine(s) 112 for use. In some implementations, the availability request 612 may indicate a number of laundry machine(s) 112 that the user 102 may wish to use, and the availability information 618 may describe those (e.g., nearby) laundromats 100 that have the desired number of currently available laundry machine(s) 112.

The management module(s) 206 may send (616), or cause to be sent, the availability 618 to the user device. The availability information 618 may be presented (620) in the UI of the customer application 310 executing on the user device.

Figure 7:
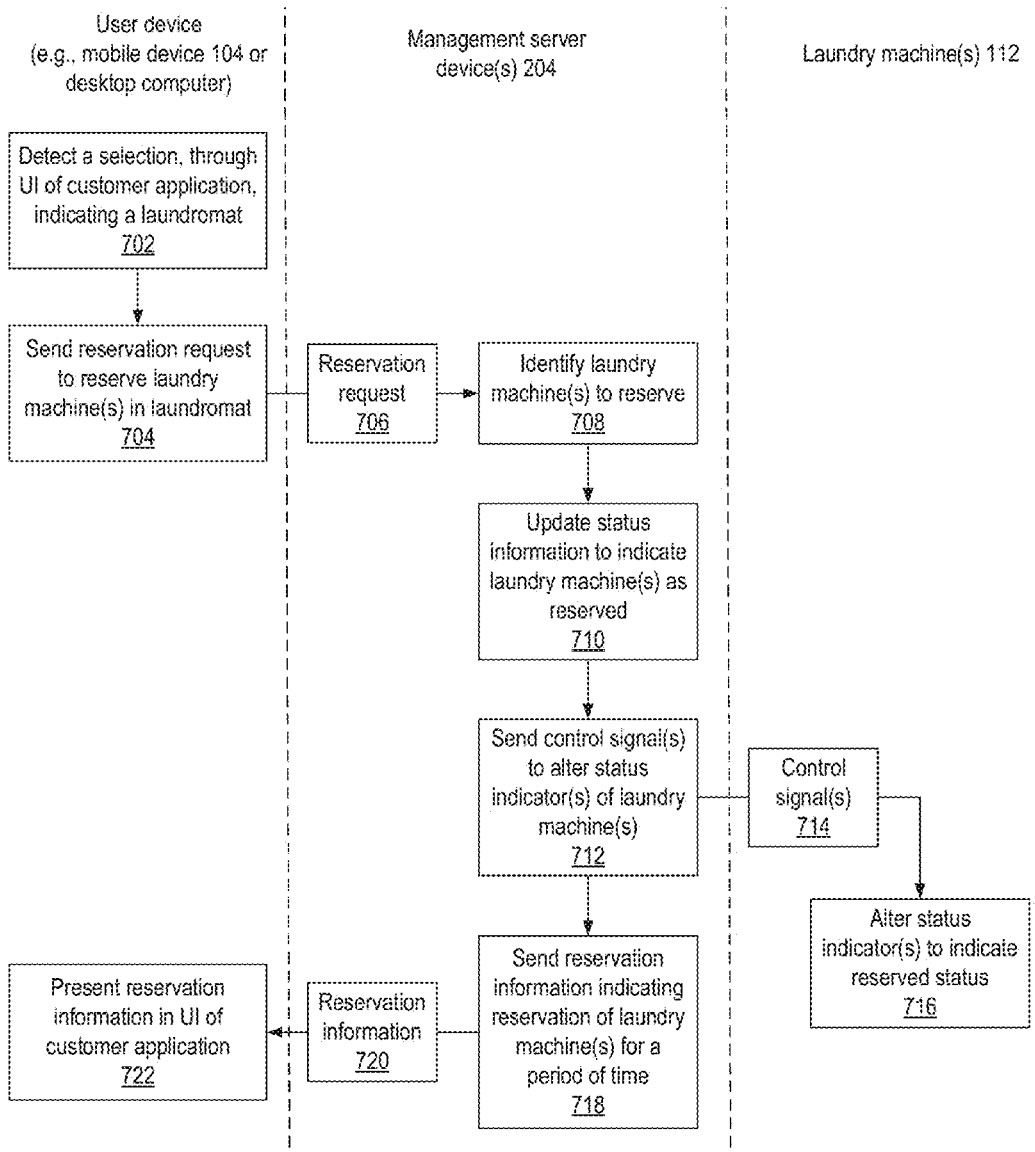
FIG. 7 depicts an example process that may be executed in accordance with implementations of the present disclosure.

FIG. 7 depicts an example process that may be executed in accordance with implementations such as those of the present disclosure. FIG. 7 describes an example process for reserving laundry machine(s) 112 at laundromat(s) 100. Operations of the process may be performed by one or more of the customer application 310, other module(s) executing on the mobile device 104, the management module(s) 206, other module(s) executing on the management server device(s) 204, firmware or other software executing on the laundry machine 112, or other module(s) executing on other device(s).

The customer application 310 may detect (702) a selection made by the user 102 through the UI of the customer application 310, the selection indicating a laundromat 100. The selected laundromat 100 may be one of the laundromat(s) 100 indicated in the availability information 618 as having currently available laundry machine(s) 112.

The customer application 310 may send (704) a reservation request 706 to request the reservation of one or more laundry machines 112 at the selected laundromat 100. In some implementations, the customer application 310 may enable the user 102 to indicate a number of laundry machine(s) 112 to reserve, and the reservation request 706 may indicate the desired number of laundry machine(s) 112 at the selected laundromat 100.

The management module(s) 206 may access the reservation request 706 and identify (708) the requested number of laundry machine(s) 112 to reserve at the laundromat 100. This identification may be based at least in part on the status information 208 which indicates the currently free laundry machine(s) 112 at the laundromat 100. In some implementations, the determining of which laundry machine(s) 112 to reserve may be made based at least in part on load balancing considerations. For example, the particular laundry machine(s) 112 may be selected based on a determination that those laundry machine(s) 112 are underused compared to other laundry machine(s) 112. Such a determination may be made based on an analysis of operational data collected from laundry machine(s) 112, as described with reference to FIG. 11.

In some implementations, when reserving a laundry machine 112, the management module(s) 206 may determine a laundry machine 112 to reserve based on information regarding when a current load is finishing and/or when a machine finishes (or is expected to finish) operating in a certain status or statuses. For example, all the laundry machines 112 in a laundromat 100 may be currently in use, but the status information 208 may indicate that one laundry machine 112 will be finishing in one minute. The management module(s) 206 may reserve that laundry machine 112, given that the current load is expected to finish by the time the reserving user 102 arrives. Other information may also be considered, such as information indicating that the previous user 102 has requested that their laundry be removed from the laundry machine 112 by an attendant, or information that the previous user 102 of the laundry machine 112 is currently in the laundromat 100 and available to remove their laundry from the laundry machine 112 when the current cycle completes.

The management module(s) 206 may update (710) the status information 208 to indicate the identified laundry machine(s) 112 as reserved. The management module(s) 206 may also send (712), or cause to be sent, control signal(s) 714 to alter the status indicator(s) 116 of the laundry machine(s) 112. The control signal(s) 714 may be received by the microcontroller 302 of the laundry machine(s) 112, and the microcontroller 302 may send a signal to alter (716) the status indicator(s) 116 to indicate a reserved status for the laundry machine(s) 112.

The management module(s) 206 may send (718), or cause to be sent, reservation information 720 to the user device. The reservation information 720 may indicate the reservation of the laundry machine(s) 112 at the laundromat 100. The reservation information 720 may also indicate a period of time during which the reservation may be held. For example, the reservation information 720 may indicate that the laundry machine(s) 112 will be reserved for use by the user 102 (or by another user with a reservation) for the next 30 minutes. In some cases, the period of time may be based at least partly on the distance of the user device from the laundromat 100, current traffic conditions, time of day, road conditions, road access, or other factors, to ensure that the user 102 has sufficient time to reach the laundromat 100 before the reservation expires.

The reservation information 720 may be received at the user device, and the customer application 310 may present (722) the reservation information 720 in the UI of the customer application 722. In cases where the management module(s) 206 were unable to reserve the requested number of laundry machine(s) 112, due to lack of availability or other considerations, the management module(s) 206 may respond to the reservation request 706 with a message describing a reason for the failed reservation, such as the lack of availability of laundry machine(s) 112 at the laundromat 100.

In some implementations, the process depicted in FIG. 6 may determine laundromat(s) 100 in proximity to the location without regard to whether such laundromat(s) 100 have currently available laundry machine(s) 112. In such cases, the availability information 618 presented in the UI of the customer application 310 may indicate all the laundromat(s) 100 in the vicinity without regard to machine availability. The process depicted in FIG. 7 may receive the reservation request 706 indicating a desired number of laundry machine(s) 112, and determine whether to approve or disapprove the reservation request 706 based on whether the selected laundromat 100 currently has at least the desired number of laundry machine(s) 112 requested.

Figure 8:
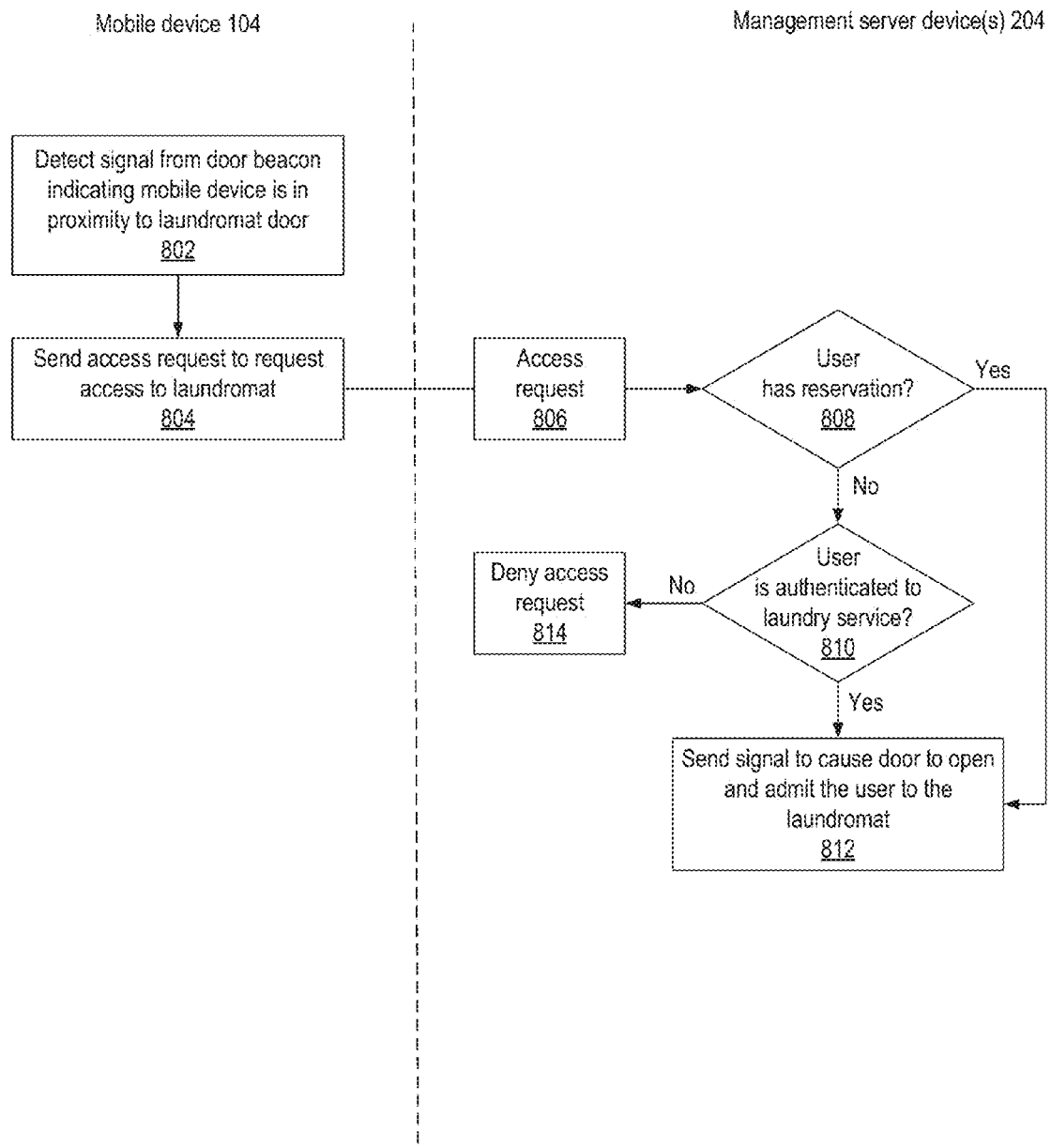
FIG. 8 depicts an example process that may be executed in accordance with implementations of the present disclosure.

FIG. 8 depicts an example process that may be executed in accordance with implementations such as those of the present disclosure. FIG. 8 describes an example process for providing access to a laundromat 100. Operations of the process may be performed by one or more of the customer application 310, other module(s) executing on the mobile device 104, the management module(s) 206, other module(s) executing on the management server device(s) 204, or other module(s) executing on other device(s).

As described with reference to FIG. 1, a network interface of the user's mobile device 104 may detect (802) a signal emitted by the beacon 110 in proximity to the door(s) 106 of the laundromat 100. The detection of the signal with a received signal level higher than a threshold level may indicate that the mobile device 104 is within a threshold distance of the door(s) 106 or otherwise in proximity to the door(s) 106.

The customer application 310, based on the detected signal, may send (804) an access request 806 to request access to the laundromat 100. The management module(s) 206 may receive the access request 806 and determine (808) whether the user 102 has a previously-made reservation for one or more laundry machines 112 in the laundromat 100. If so, the process may proceed to 812. If not, the management module(s) 206 may determine (810) whether the user 102 is an authenticated customer of the laundry service. If not, the process may deny (814) the access request 806, e.g., denying the user 102 access to the laundromat 100. In some cases, denial of access may include sending a message to the mobile device 104 indicating a reason for the denial of access (e.g., unauthorized user, lack of reservation, and so forth). If it is determined at 810 that the user 102 is an authenticated customer of the laundry service, the management module(s) 206 may send (812) a signal to cause the door(s) 106 to open and admit the user 102 to the laundromat 100.

In some implementations, as in the example of FIG. 8, a user 102 may be admitted to a laundromat 100 if the user 102 has a reservation of one or more laundry machines 112 in the laundromat 100 or if the user 102 has no reservation but is a customer of the laundry service. In some implementations, a user 102 may not be admitted to a laundromat unless the user 102 has reserved laundry machine(s) 112 in the laundromat 100, even if the user 102 is an authenticated customer of the laundry service. Although the example of FIG. 8 depicts the management server device(s) 204 operating as an intermediary to determine whether the user 102 is to be granted access to a laundromat 100, implementations are not so limited. In some implementations, the determination whether to admit a user 102 to a laundromat 100 may be made by software executing in the door mechanism 108 or some other computing device physically located in, or in proximity to, the laundromat 100, or on another computing device that is in communication with the door mechanism 108.

Figure 9A:
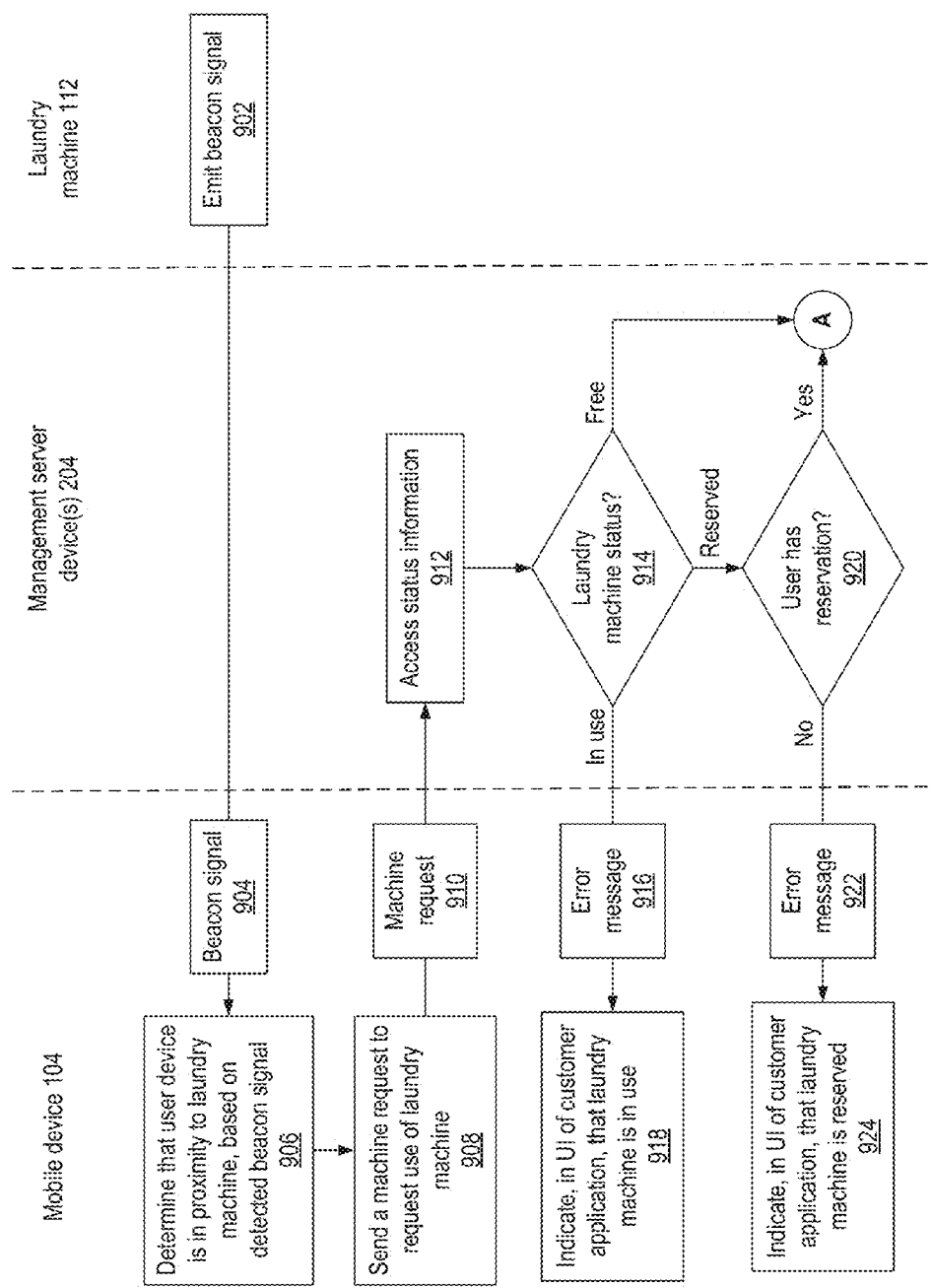
FIGS. 9A and 9B depict an example process that may be executed in accordance with implementations of the present disclosure.
Figure 9B:
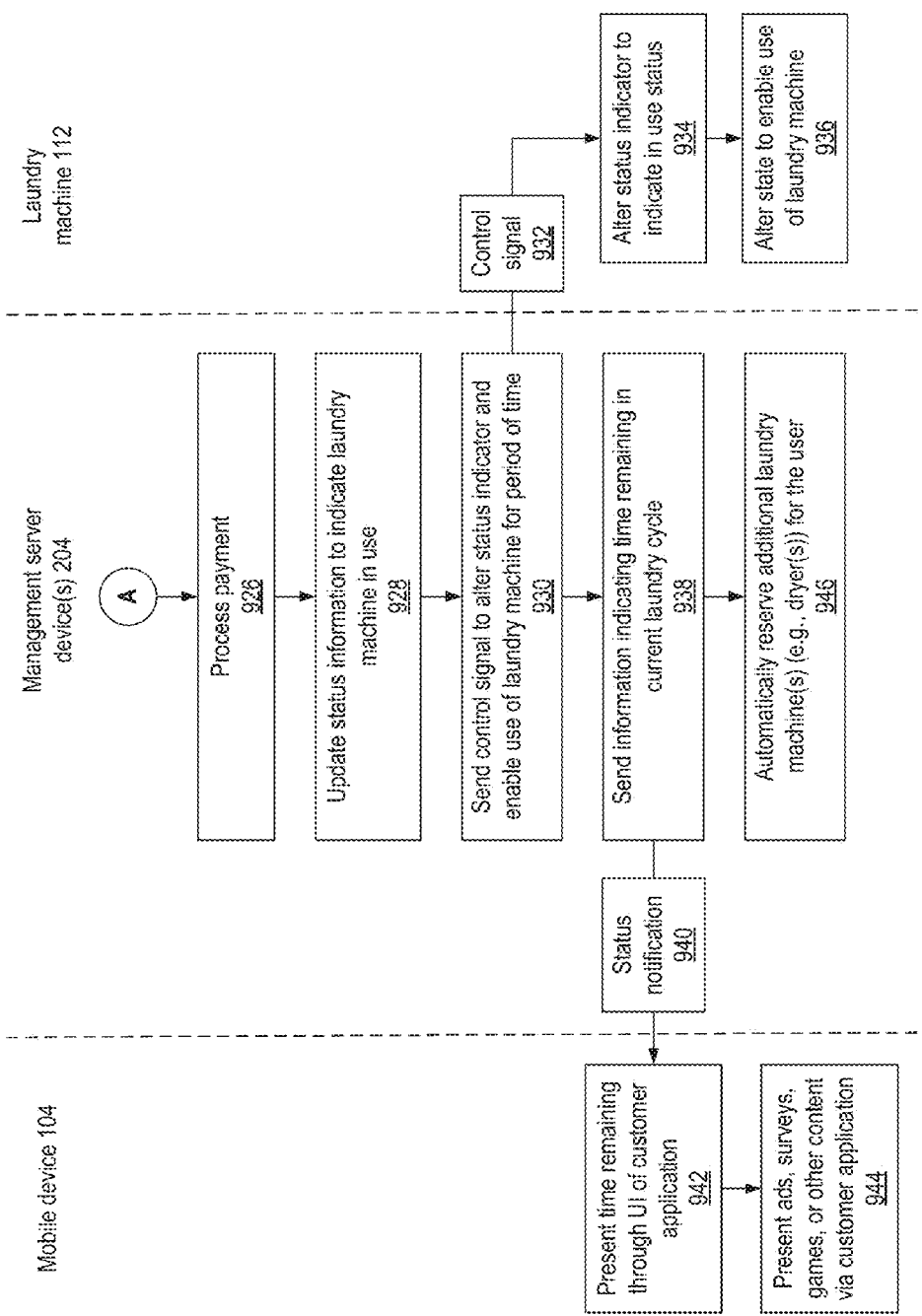

FIGS. 9A and 9B depict an example process that may be executed in accordance with implementations such as those of the present disclosure. FIGS. 9A and 9B describe an example process for enabling the use of a laundry machine 112. Operations of the process may be performed by one or more of the customer application 310, other module(s) executing on the mobile device 104, the management module(s) 206, other module(s) executing on the management server device(s) 204, firmware or other software executing on the microcontroller 302 of the laundry machine 112, or other module(s) executing on other device(s).

The laundry machine 112 may emit (902) a beacon signal 904 that indicates the presence of the laundry machine 112. In some implementations, as described above, the beacon signal 904 may include an identifier that (e.g., uniquely) identifies the laundry machine 112.

Based on detecting the beacon signal 904 at the mobile device 104, the customer application 310 may determine (906) that the mobile device 104 is in proximity to the laundry machine 112. For example, the mobile device 104 may be moved into proximity with a beacon 114 of the laundry machine 112, in a bump motion performed by the user 102. Detection of the beacon signal 904 is described further with reference to FIG. 10.

The customer application 310 may extract the laundry machine identifier from the beacon signal 904, and send (908) a machine request 910 to request use of the laundry machine 112. In response to receiving the machine request 910 at the management server device(s) 204, the management module(s) 206 may access (912) the status information 208 indicating the current status of the various laundry machines 112 managed by the laundry service.

Based on the status information 208, the management module(s) 206 may determine (914) the current status (e.g., free, in use, or reserved) of the laundry machine 112 that the mobile device 104 bumped with. If the laundry machine 112 is currently in use, the management module(s) 206 may send, or cause to be sent, an error message 916. In response to receiving the error message 916, the customer application 310 may indicate (918) that the laundry machine 112 is currently in use, and request that the user 102 select another laundry machine 112 that is not in use.

If it is determined (914) that the laundry machine 112 is reserved, the management module(s) 206 may determine (920) whether the user 102 previously made a reservation of at least one laundry machine 112. If not, the management module(s) 206 may send, or cause to be sent, an error message 922. In response to receiving the error message 922, the customer application 310 may indicate (924) that the laundry machine 112 is current reserved for other customer(s), and request that the user 102 select a free laundry machine 112.

If it is determined (914) that the laundry machine 112 is free, or if it is determined (920) that the user 102 has previously reserved at least one laundry machine 112, the process may proceed as described with reference to FIG. 9B.

In some implementations, the management module(s) 206 may process (926) a payment from the user 102 to the laundry service prior to enabling the laundry machine 112 for use by the user 102. If the payment is successfully processed, the management module(s) 206 may update (928) the status information 208 to indicate that the laundry machine 112 is currently in use. The management module(s) 206 may send (930), or cause to be sent, a control signal 932. The control signal 932 may be sent to the laundry machine 112. In response to receiving the control signal 932, the microcontroller 302 may send a signal to alter (934) the status indicator 116 to indicate that the laundry machine 112 is currently in use. The microcontroller 302 may also send one or more signals to the control module(s) 306 to alter (936) the operational state of the laundry machine 112 and to enable its use for doing laundry.

The management module(s) 206 may send (938), or cause to be sent, a status notification 940 indicating that the laundry machine 112 is now available for use. The status notification 940 may also indicate an amount of time remaining in the current laundry cycle on the laundry machine 112.

The customer application 310 executing on the mobile device 104 may access the status notification 940 received at the mobile device 104, and present (942) the time remaining in the UI of the customer application 310.

In some implementations, the customer application 310 may be configured to present (944) advertisements, surveys, games, or other content via the UI of the customer application 310 while the laundry cycle is in progress. In some implementations, such content may be presented based on a determination that the user 102 is currently in the laundromat 100. Presentation of additional content may provide a positive user experience by giving the user 102 something to do while waiting for their laundry to finish. In some cases, the laundry service may receive payment from advertisers, advertising networks, survey organizations, or other parties based on the presentation of the content to users, or based on the amount of time during which the content is presented.

In some implementations, in response to enabling the use of the laundry machine 112 for the user 102, the management module(s) 206 may automatically reserve (946) additional laundry machine(s) 112 for subsequent use. For example, if the initially enabled laundry machine 112 is a washer, the management module(s) 206 may automatically reserve one or more dryers for subsequent use by the user 102 based on an inference that the user 102 may want to dry their laundry after it is washed. The additional laundry machine(s) 112 may be automatically reserved at a time following the expiration of the period of time for use of the initial laundry machine 112, such as after the completion of a wash cycle.

In some implementations, the laundry service processes a payment from the user 102 prior to enabling the user 102 to use laundry machine(s) 112. In some cases, the payment may be per use, such that the user 102 authorizes a payment for each trip to the laundromat 100. In some cases, the user 102 may have previously added value to an account managed by the laundry service, and the laundry service may debit the account according to the value of services provided. The laundry service may also offer a subscription plan, in which the user 102 provided a predetermined periodic (e.g., monthly) payment in return for the use of laundry machine(s) 112 or other services. In some implementations, the laundry service may enable multiple users 102 to share laundry machine(s) 112 or other services, and the payment(s) may be split among the multiple users 102.

In some implementations, the laundry service provides the ability for one user 102 to gift credit or value to another user 102, in the form of a gift certificate, gift card, or other form of value. Moreover, in some cases the laundry service provides bonuses, discounts, or other types of rewards to users 102 who are repeat customers, refer other customers, or otherwise display loyalty. For example, a user 102 may be given a discount on every tenth use of the laundry service, or may be given free dryer time, free folding, or other perks.

In some implementations, the user 102 may still be enabled to use the laundry machine 112 even when the user device 104, the laundry machine 112, or both are offline without access to a network. In such cases, the user device 104 may store a secure token or other information previously received from the laundry service to indicate that the user 102 is authorized to use laundry machine(s) 112 without a currently processed payment. The token may itself indicate an amount of value, or may indicate a promise of later payment by the user 102. For example, the token may be encrypted and transferred to the user device 104, and subsequently transferred to the microcontroller 302 to cause the microcontroller 302 to enable use of the laundry machine 112. Payment processing, accounting operations, or other actions may be performed later when the user device 104 or laundry machine 112 regains network access. In this way, implementations may enable customers to do laundry even during network outages.

Figure 10:
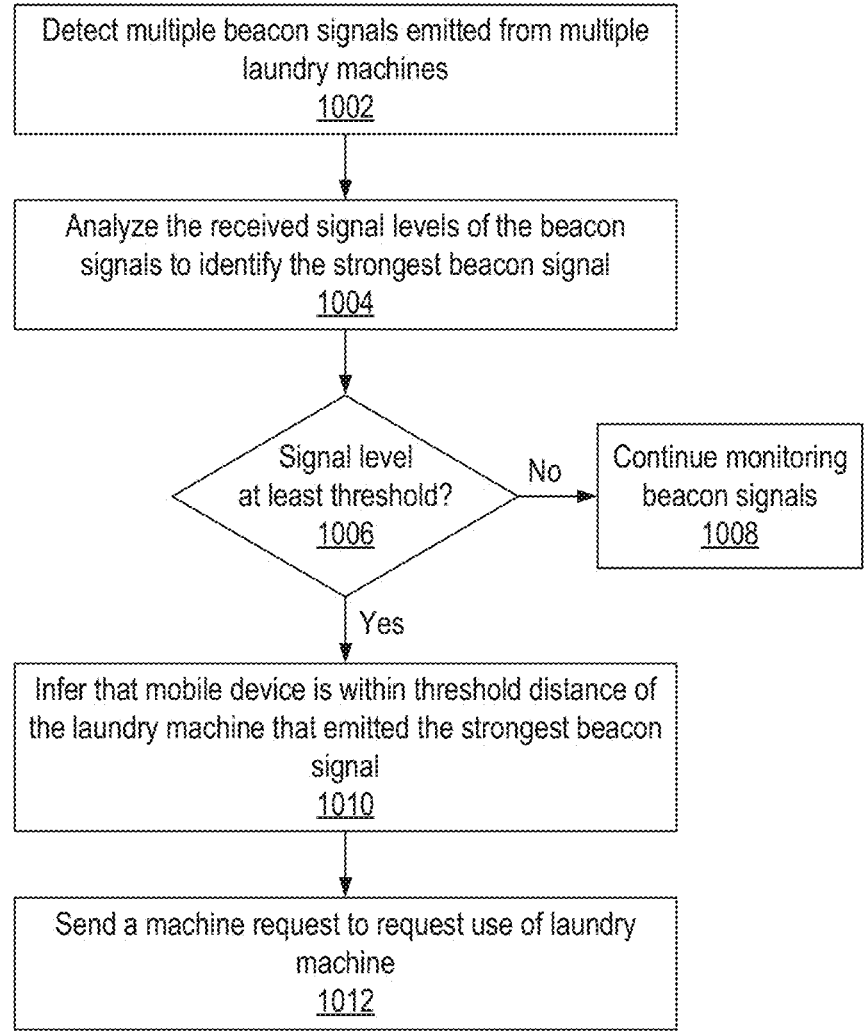
FIG. 10 depicts an example process that may be executed in accordance with implementations of the present disclosure.

FIG. 10 depicts an example process that may be executed in accordance with implementations such as those of the present disclosure. FIG. 10 describes an example process for determining that a mobile device 104 is in proximity to a particular laundry machine 112. Operations of the process may be performed by one or more of the customer application 310, other module(s) executing on the mobile device 104, or other module(s) executing on other device(s).

When the user 102 enters a laundromat 100 with their mobile device 104, a network interface of the mobile device 104 may detect (1002) multiple beacon signals emitted from the various laundry machines 112 in the laundromat 100. The customer application 310 may analyze (1004) the received signal levels (e.g., signal strengths) of the multiple beacon signals to identify the strongest beacon signal, e.g., the beacon signal with the highest received signal level.

The customer application 310 may determine (1006) whether the received signal level of the strongest beacon signal is at least a predetermined threshold level corresponding to a threshold distance. If not, the customer application 310 may continue monitoring (1008) beacon signals to determine whether the mobile device 104 is subsequently bumped with a laundry machine 112. In some implementations, the beacon signal (e.g., the strongest beacon signal) may be analyzed to measure its signal level as received at the mobile device 104. Based on the signal level, the distance between the mobile device 104 and the laundry machine 112 (or the beacon 114) may be determined. In some cases, a relationship between signal level and distance may have been determined based on a prior calibration to measure distance versus signal level for various distances, using a beacon signal having a particular transmitted power. In some cases, the relationship may be based at least partly on physical principles. For example, the signal level may be proportional to the inverse square of the distance.

If it is determined (1006) that the received signal level of the strongest beacon signal is at least the threshold level, the customer application 310 may infer (1010) or otherwise determine that the mobile device 104 is within the threshold distance of the laundry machine 112 that emitted the strongest beacon signal. In response, the customer application 310 may send (1012), or cause to be sent, the machine request to request the use of the laundry machine 112 as described with reference to FIGS. 9A and 9B.

Figure 11:
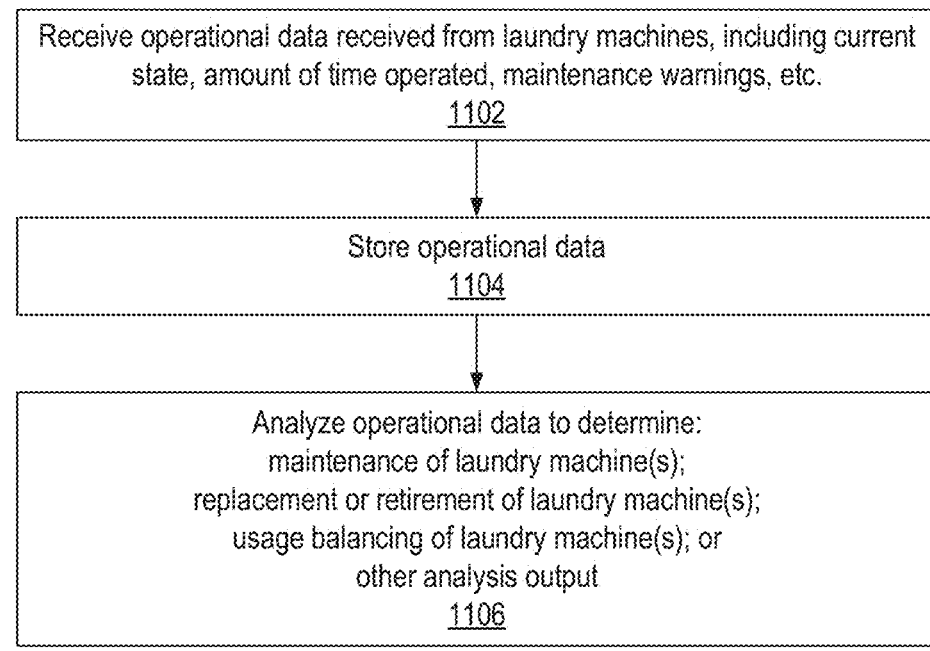
FIG. 11 depicts an example process that may be executed in accordance with implementations of the present disclosure.

FIG. 11 depicts an example process that may be executed in accordance with implementations such as those of the present disclosure. FIG. 11 describes an example process for analyzing operational data collected from laundry machine(s) 112. Operations of the process may be performed by one or more of the management module(s) 206, other module(s) executing on the management server device(s) 204, or other module(s) executing on other device(s).

In some implementations, the microcontroller 302 may be configured to collect operational data regarding the operations of the laundry machine 112. Such operational data may be generated by the control module(s) 306, by the microcontroller 302, or by other components of the laundry machine 112, and collected by the microcontroller 302. The operational data may include, but is not limited to, one or more of the following: data describing an amount of time when the laundry machine 112 has been operating, or an amount of time when the laundry machine 112 has been idle; data describing the number, duration, and type of cycles run on the laundry machine 112; data describing a weight or other measured amount of laundry processed by the laundry machine 112; data describing the temperature of the laundry machine 112 at one or more times or over a period of time; data describing the current operational state; data describing the past operational state of the laundry machine 112 at one or more times; maintenance warnings or alerts; or other data. In some cases, the microcontroller 302 may periodically run tests, checks, or other diagnostics on the laundry machine 112 to measure its operating condition. The results of the diagnostics may also be included in the operational data. The operational data may be periodically generated and collected, or may be continuously generated and collected. The microcontroller 302 may send the operational data, via the network interface(s) 304a, to the management server device(s) 204.

In some implementations, other types of operational data may be collected. For example, operational data may include information describing how long user(s) 102 stay in the laundromat 100, how many user(s) 102 are in the laundromat 100, how often and where the user(s) 102 move within the laundromat 100, whether an attendant user 506 is in the laundromat 100, a number of attendant users 506 in the laundromat 100, how often and where the attendant users 506 move within the laundromat 100, or other information. Such operational data may be received from the user device(s) 104 of user(s) 102 or attendant user(s) 506, and may be stored as status information 208.

The management module(s) 206 may receive (1102) the operational data sent from one or more laundry machines 112 or the user device(s) 104. In some implementations, the management module(s) 206 may store (1104) the operational data (e.g., as status information 208). The operational data may be stored in persistent memory on the management server device(s) 204 or elsewhere. In some cases, the operational data may be received and processed in the active memory of the executing management module(s) 206.

The management module(s) 206 may analyze (1106) the operational data to determine analysis output (e.g., one or more metrics) for one or more laundry machines 112. For example, the operational data may be analyzed to determine laundry machine(s) 112 that may require maintenance, given the amount of time the laundry machine(s) 112 have been operated since last maintenance. In some cases, the operational data may be analyzed to determine laundry machine(s) 112 that have been operated long enough that they may be retired or replaced by new laundry machine(s) 112. The analysis of operational data is described further with reference to FIGS. 19-22.

In some implementations, the operational data may be analyzed to determine which laundry machine(s) 112 in a particular laundromat 100 have been overused or underused compared to other laundry machine(s) 112 in the laundromat 100. Such a determination may be employed to identify which laundry machine(s) 112 to reserve for use, and may enable the load balancing of the usage of multiple laundry machine(s) 112 in a laundromat 100. For example, in response to a reservation request, the management module(s) 206 may reserve one or more laundry machines 112 that have been operated for less time than other laundry machine(s) 112 in the laundromat 100.

The operational data may also be analyzed to generate other types of analysis output. For example, the operational data may be analyzed to identify patterns of use of different laundry machine(s) 112 in a laundromat 100, and such an analysis may be employed to optimize the layout of the laundromat 100 or other laundromats and provide a more convenient user experience for customers. Operational data may be analyzed to determine whether a particular laundromat 100 is operating below capacity, such that laundry machine(s) 112 may be moved from the laundromat 100 to another laundromat 100, or such that it may be cost-effective for the laundry service to close the laundromat 100 or reduce its operating hours. Operational data may also be analyzed to determine whether a particular laundromat 100 is in high demand by customers, such that reservations are being denied to customers due to lack of available laundry machine(s) 112. Based on such an analysis result, a determination may be made to add more laundry machine(s) 112 to the laundromat 100, increase the available hours of the laundromat 100, or open additional laundromat(s) 100 in the area to service the previously unsatisfied demand. Operational data may also be analyzed to determine, for a laundromat 100, optimal hours during which the laundromat 100 may be open, closed, staffed by attendant(s), unstaffed by attendant(s), and so forth.

Figure 12:
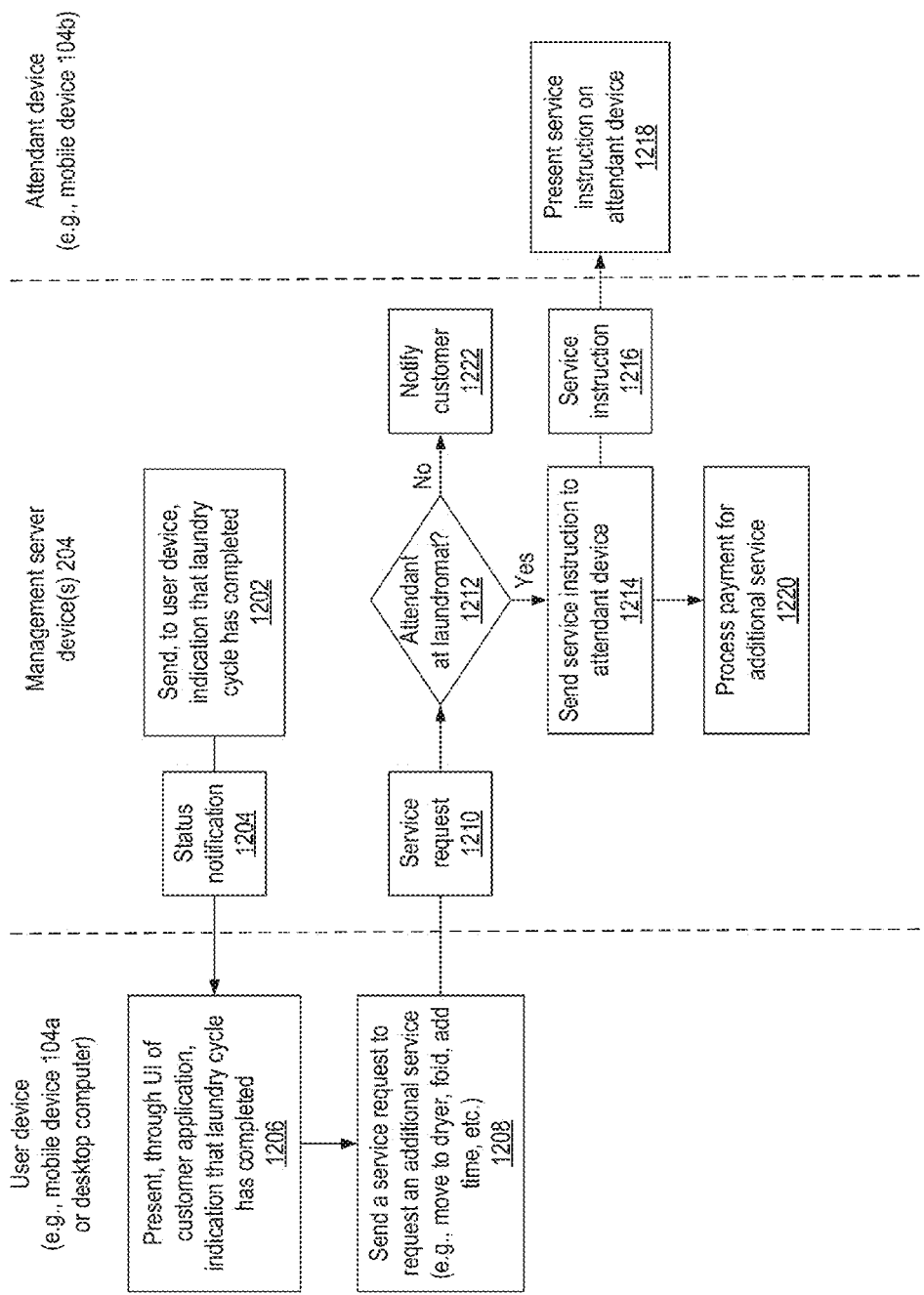
FIG. 12 depicts an example process that may be executed in accordance with implementations of the present disclosure.

FIG. 12 depicts an example process that may be executed in accordance with implementations such as those of the present disclosure. FIG. 12 describes an example process for processing service request(s) for additional service(s) to be performed with respect to laundry. Operations of the process may be performed by one or more of the customer application 310, other module(s) executing on the mobile device 104 (e.g., a customer device), an attendant application, other module(s) executing on the mobile device 104 (e.g., an attendant device), the management module(s) 206, other module(s) executing on the management server device(s) 204, or other module(s) executing on other device(s).

The management module(s) 206 may determine that a laundry cycle, or other predetermined operational period of time, has expired on a laundry machine 112 being used by a user 102. The management module(s) 206 may send (1202), or cause to be sent, a status information 1204 indicating that the period of operation has finished on a particular laundry machine 112. The status notification 1204 may be presented (1206) through the UI of the customer application 310 executing on the user's mobile device 104, desktop computer, or other computing device.

In some implementations, as described with reference to FIG. 5, the customer application 310 may include one or more features that enable a user 102 to request additional service(s) be performed with respect to the user's laundry. The customer application 310 may detect such a request and send (1208), or cause to be sent, service request(s) 1210 to request additional service(s) such as moving laundry from a washer to a dryer, removing laundry from a dryer, folding laundry, adding more time to a laundry machine 112, and so forth.

On receiving the service request(s) 1210, the management module(s) 206 may determine (1212) whether an attendant currently present at the laundromat 100. In some cases, a laundromat 100 may not be staffed with an attendant at all hours of the day. If it is determined that no attendant is currently available at the laundromat 100, the user 102 (e.g., the customer) may be notified (1222). For example, the management module(s) 206 may respond to the service request(s) 1210 with a message indicating, to the customer, that the additional service(s) are not currently available.

If an attendant is currently present at the laundromat 100, the management module(s) 206 may send (1214), or cause to be sent, one or more service instructions 1216 to be presented on an attendant device operated by the attendant (e.g., user 506). An attendant application executing on the attendant device (e.g., mobile device 104) may present (1218) the service instruction(s) 1216 to prompt the attendant to perform the additional service(s). The management module(s) 206 may process (1220) payment for the additional service(s), in cases where payment is to be charged to the user 102 for the additional service(s).

Figure 13:
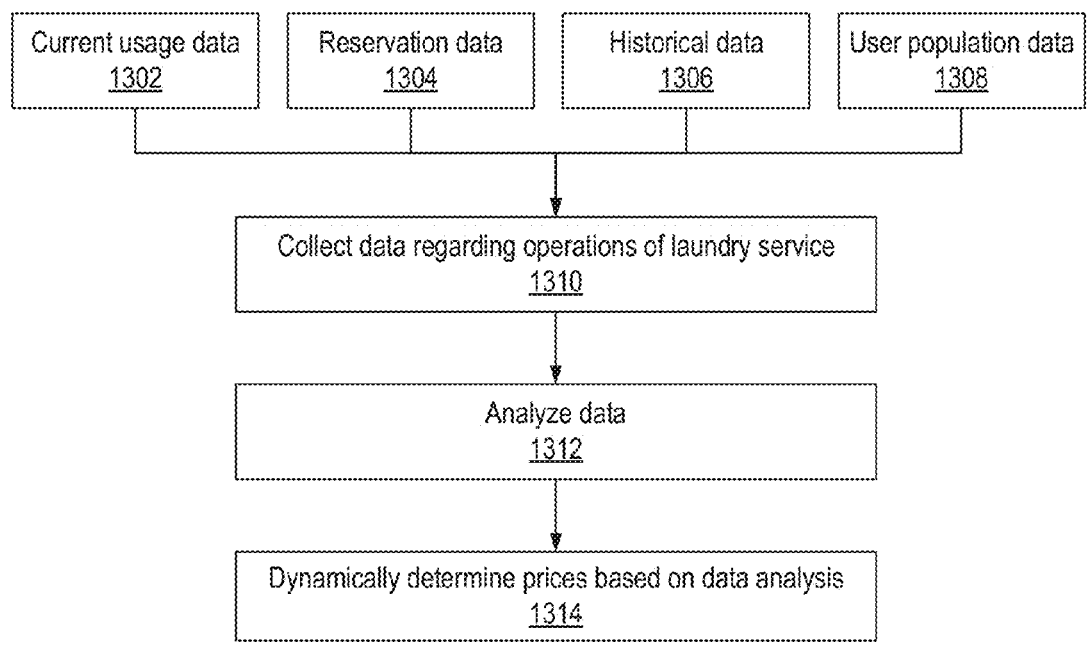
FIG. 13 depicts an example process that may be executed in accordance with implementations of the present disclosure.

FIG. 13 depicts an example process that may be executed in accordance with implementations such as those of the present disclosure. FIG. 13 describes an example process for dynamically determining pricing within the laundry service. Operations of the process may be performed by one or more of the management module(s) 206, other module(s) executing on the management server device(s) 204, or other module(s) executing on other device(s).

The management module(s) 206 may collect (1310) data regarding the operations of the laundry service. Such data may include, but is not limited to: current usage data 1302 describing the current usage (or non-usage) of the laundry machines 112 managed by the laundry service; reservation data 1304 describing the current reservations of laundry machine(s) 112; historical data 1306 describing the past usage and reservations of laundry machine(s) 112; or user population data 1308 describing the number, locations, distribution, density, or other characteristics of the users 102 currently registered as customers of the laundry service.

The management module(s) 206 may analyze (1312) the data collected at 1310 and dynamically determine (1314) pricing of laundry services based on the data analysis. The laundry service may charge a price to the user 102 for the use of a washer, dryer, other laundry machine(s) 112, or for the additional service(s) described with reference to FIGS. 5 and 12. In some implementations, the pricing may be dynamically modifiable based on various considerations. For example, if particular laundromat(s) 100, or the laundry service generally, is exhibiting an increase in usage during a particular time of day, day of the week, day of the year, and so forth, the price of laundry service(s) (e.g., washing, drying, etc.) may be decreased or increased during such times. Moreover, if a particular laundromat 100 is being underutilized, the price of services at that laundromat 100 may be lowered to encourage more customers to try the laundry service. In some cases, if a particular laundromat 100 is experiencing high usage compared to other laundromats 100 in the area, prices at the high-usage laundromat 100 may be increased or prices at the lower-usage laundromats 100 may be decreased to encourage customers to use other laundromats 100. Moreover, prices at one or more laundromats 100 may be lowered as part of a sale, promotion, or other marketing strategy to encourage customers to use the laundry service. In some cases, lower prices may be charged at a new laundromat 100, during a period of time following the opening of the new laundromat 100, to introduce the laundry service to new customers. In some cases, the laundry service may monitor laundry machine(s) 112 to detect instances in which laundry is left in a machine after a cycle or operation time period has completed, and a user 102 may be charged for the time when the laundry is blocking others from using the machine. Such charges, as well as any other charges for laundry services, may be dynamically adjusted.

FIGS. 14-17 depict an example UI that may be employed to interact with a laundry service in accordance with implementations such as those of the present disclosure. The example UI of FIGS. 14-17 may be presented by the customer application 310 on the mobile device 104 or other user device such as a desktop computer. Although the examples of FIGS. 14-17 depict a UI having a particular arrangement of UI elements, implementations are not limited to these examples. Implementations may provide a UI that includes any number and arrangement of elements such as text, images, graphics, video, animations, and so forth that present information in any format. Moreover, the UI may include any number, type, and arrangement of controls that enable a user 102 to interact with the UI, including but not limited to text entry fields, numeric entry fields, buttons, radio buttons, check boxes, slider controls, active (e.g., clickable) images or graphics, maps, menus, lists, and so forth. Moreover, although FIGS. 14-17 depict a UI configured to present information visually, implementations are not so limited. Implementations also support a UI that presents information via sounds, music, spoken text output, or other audio output. Moreover, implementations support a UI that presents information as a haptic output via a vibration or other movement of a computing device. Although FIGS. 14-17 depicts an example UI of the customer application 310 presented on a mobile device 104, the UI of the customer application 310 may also be presented on other types of computing devices such as a desktop computer.

Figures 14A, 14B:
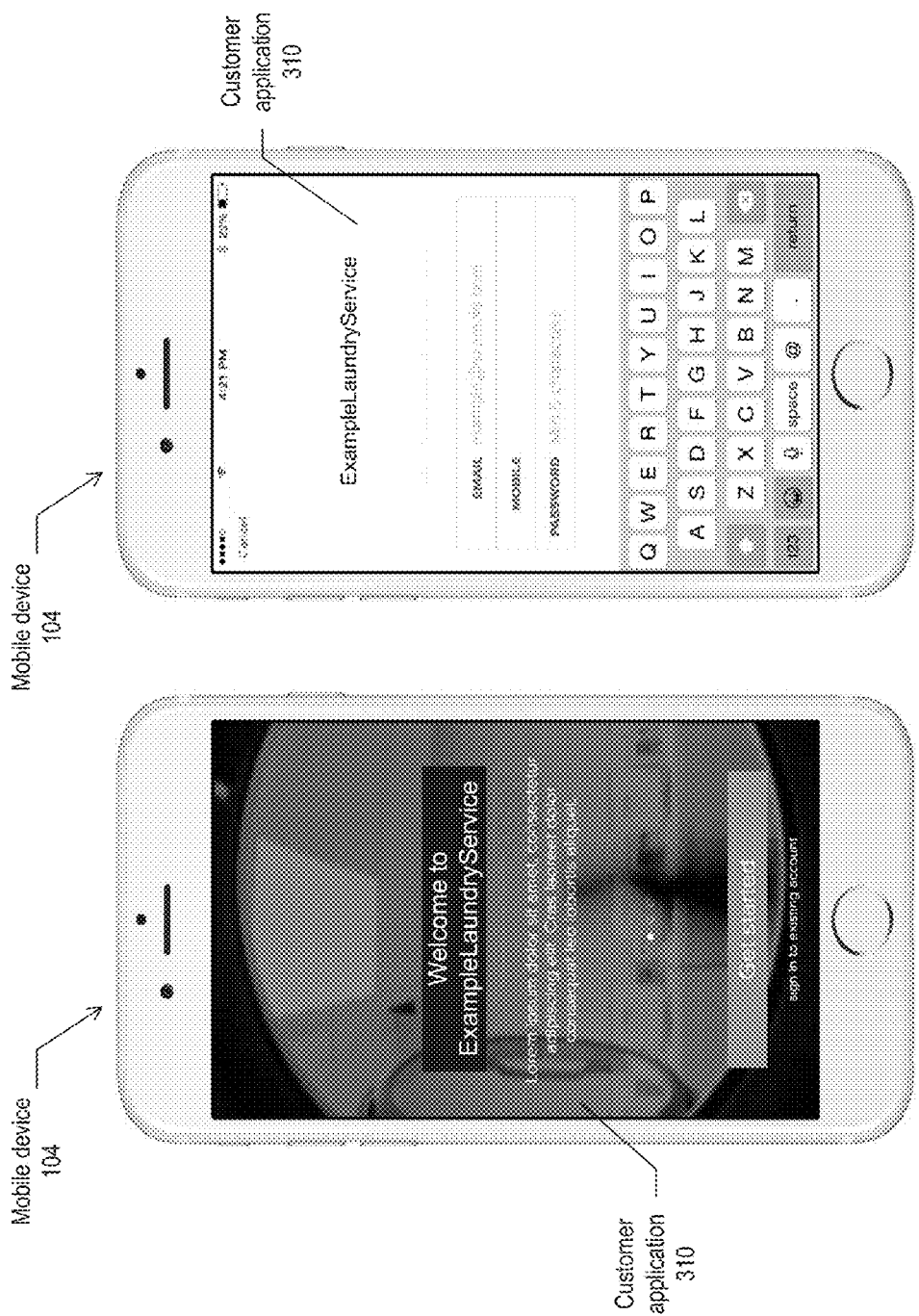

FIG. 14A depicts an example of an initial screen of the UI which may be presented when the user 102 launches the customer application 310 on their mobile device 104 or other user device. As shown in the example, the initial screen may identify the laundry service (e.g., ExampleLaundryService) and may provide a control to enable the user 102 to register, e.g., set up a new account with the laundry service, if they are not already registered. The UI may provide a link to enable a user 102 to sign in to an existing account, if they are already registered. Registration may include the user providing information such as their name, address, email address, telephone number, other contact information, payment method(s), username, password, other credential(s), and so forth. Such information may be stored as part of a user account for the user. Signing in may include the user providing the previously stored credentials, such as username, password, and so forth, to enable authentication of the user and verification that the user is authorized to access the service.

FIG. 14B depicts an example of a UI screen that may be presented to enable a user 102 to register with the laundry service by entering user information such as an email address, mobile phone number, and password.

Implementations may also collect other information from the user 102 during registration, such as information regarding payment methods, home address, user preferences, preferred laundromat location(s), and so forth. For example, FIG. 14C depicts a screen in which the user 102 may enter payment method information by scanning a credit card using an image collected by a camera on the mobile device 104. As shown in the example of FIG. 14D, the customer application 310 may also enable the user 102 to provide payment method information manually by entering a name on a credit card, the card number, an expiration date, and a security code. Although examples herein may describe the use of a credit card for payment, implementations support other payment methods as well. Possible payment method(s) may include, but are not limited to, one or more of a credit card, a bank account, a phone service account, an online payment processing service account, digital or electronic currency, and so forth.

FIG. 15A depicts an example of a UI screen in which availability information 618 is presented within a map of the area in proximity to the user 102 or the mobile device 104. As described above, the availability information 618 may indicate the laundromat(s) 100 which currently have available laundry machine(s) 112. Alternatively, the availability information 618 may indicate all the laundromat(s) 100 in the vicinity that are managed via the laundry service. The current location 1502 of the mobile device 104, or of the user 102, may also be indicated in the map, as shown in FIG. 15A.

FIG. 15B depicts an example of a UI screen in which the user 102 has selected a particular laundromat 100 at which to do laundry. The laundromat selection 1504 may be indicated in the UI, such as on a map. The UI may also provide other information regarding the selected laundromat 100, such as the address of the laundromat 100, available hours, number of currently available laundry machine(s) 112, customer ratings or reviews, pricing information, and so forth. As shown in the example of FIG. 15B, the UI may include a control 1506 that enables a user 102 to specify the number of laundry machines 112 they would like to use to do laundry.

Figures 15C, 15D:
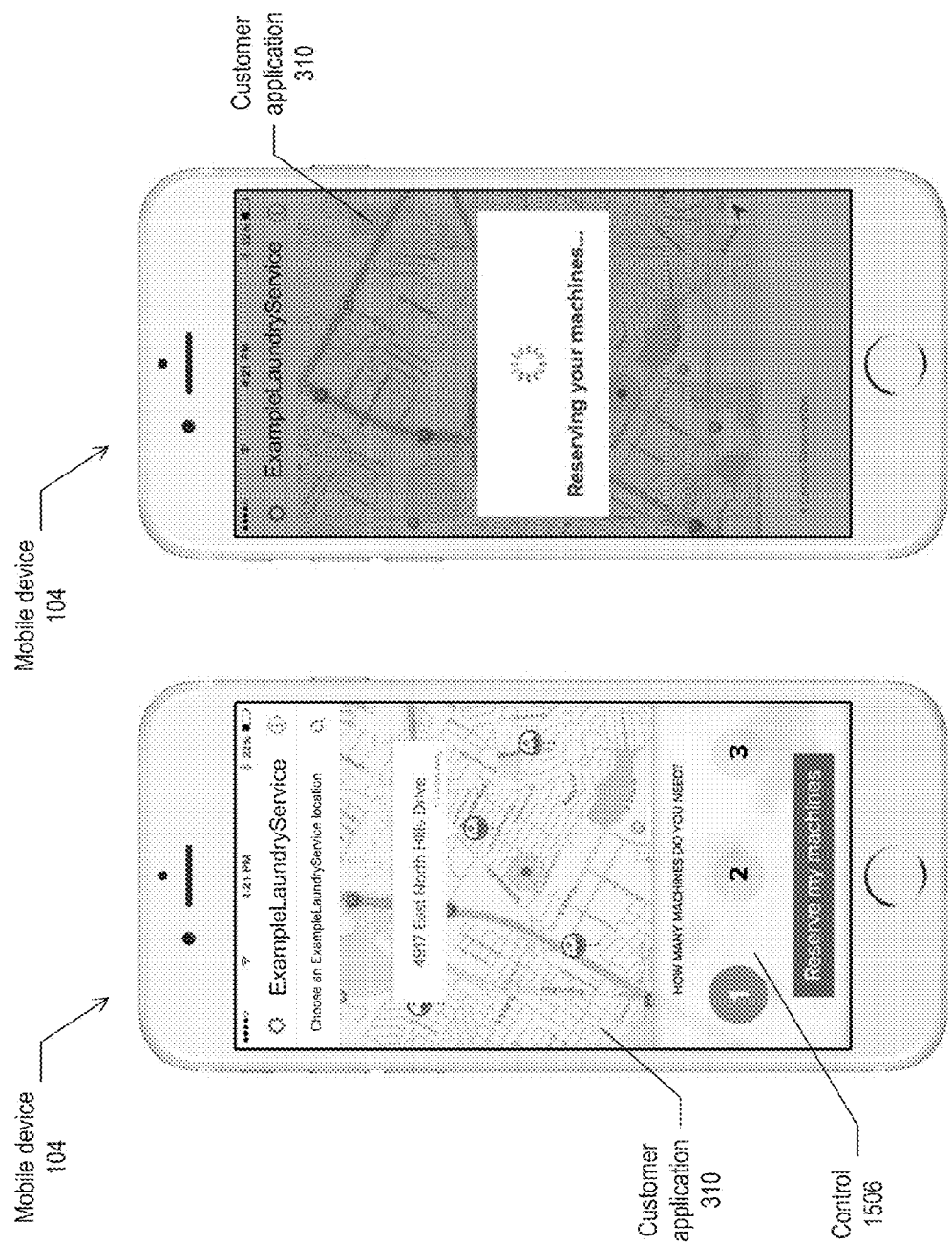

FIG. 15C depicts an example of a UI screen in which the user has indicated, via the control 1506, a number of laundry machine(s) 112 they would like to use. The user 102 may employ the control 1506 (e.g., "Reserve my machines") to generate and send a reservation request 706 to the management server device(s) 204. FIG. 15D depicts an example of a UI screen that may be presented to inform the user 102 that the reservation of the laundry machine(s) 112 is in progress.

Figures 15E, 15F:
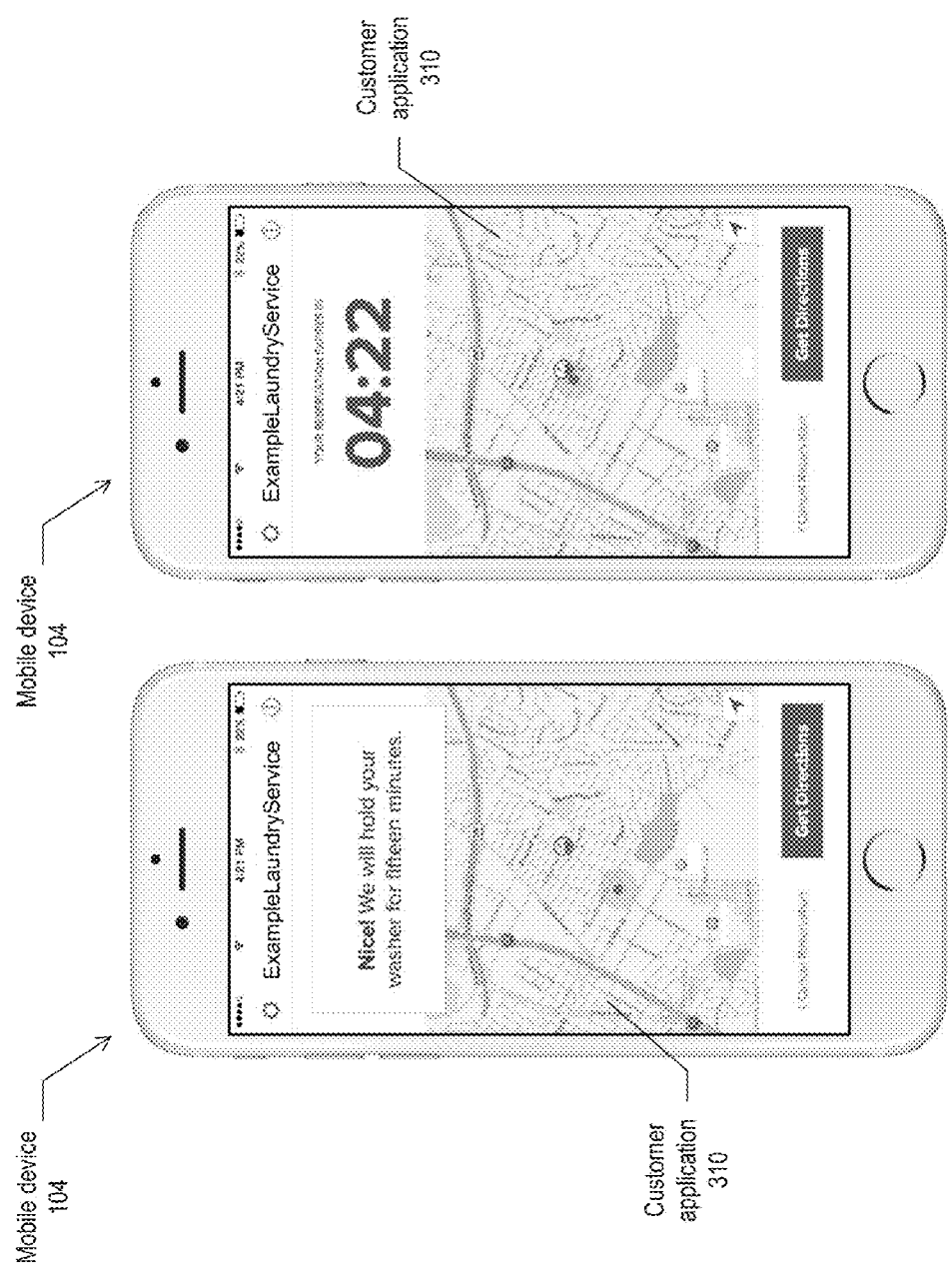

FIG. 15E depicts an example of a UI screen which may be presented to indicate, to the user 102, that the requested number of laundry machine(s) 112 have been reserved at the selected laundromat 100. The UI may indicate an amount of time (e.g., 15 minutes) during which the reservation will be held for the user 102. The UI may also indicate the current location of the mobile device 104 as the user 102 travels to the laundromat 100. As shown in the example of FIG. 15F, the UI may present the amount of time remaining on the reservation (e.g., 4 minutes and 22 seconds remaining) as the user 102 travels to the laundromat 100.

FIG. 16A depicts an example of a UI screen which may be presented to welcome the user 102 to their selected laundromat 100. This screen may be presented responsive to the user 102 approaching or entering through the door(s) 106. In some cases, the screen may be presented based on a determination that the current location of the mobile device 104 corresponds to a known location of the laundromat 100, or based on the mobile device 104 detecting one more signals emitted from laundry machine(s) 112 or other objects present in the laundromat 100.

FIG. 16B depicts an example of a UI screen which may present status information regarding the active laundry loads being processed (e.g., washed, dried, etc.) in the laundry machine(s) 112 of the laundromat 100. In the example of FIG. 16B, the user 102 has not yet started any loads in any laundry machine(s) 112. The UI screen may also present status information regarding those machine(s) that have been recently used by the user or that are being currently used by the user, including but not limited to washer(s) and/or dryer(s).

In the example of FIG. 16C, the user 102 has three loads currently in progress. The status information 1602 may indicate, for each load, which laundry machine 112 is processing the load and how much time remains. Although the example of FIG. 16C depicts status information 1602 with respect to washing loads, the status information 1602 may also describe drying loads or other types of laundry tasks. As shown in the example of FIG. 16D, the status information 1602 may indicate when each load is done.

FIG. 16E depicts an example of a UI screen in which status information 1602 is presented with a control 1604 to request an additional service. In this example, a wash load has completed and the control 1604 enables the user 102 to request that an attendant move the laundry from the washer to a dryer. Implementations support other additional service(s), as described with reference to FIGS. 5 and 12. On selecting the control 1604, the control 1604 may prompt the user 102 to approve a payment for the additional service, as shown in the example of FIG. 16F. On approving the charge, the customer application 310 may generate and send a service request for the additional service as described with reference to FIGS. 5 and 12.

Figure 17:
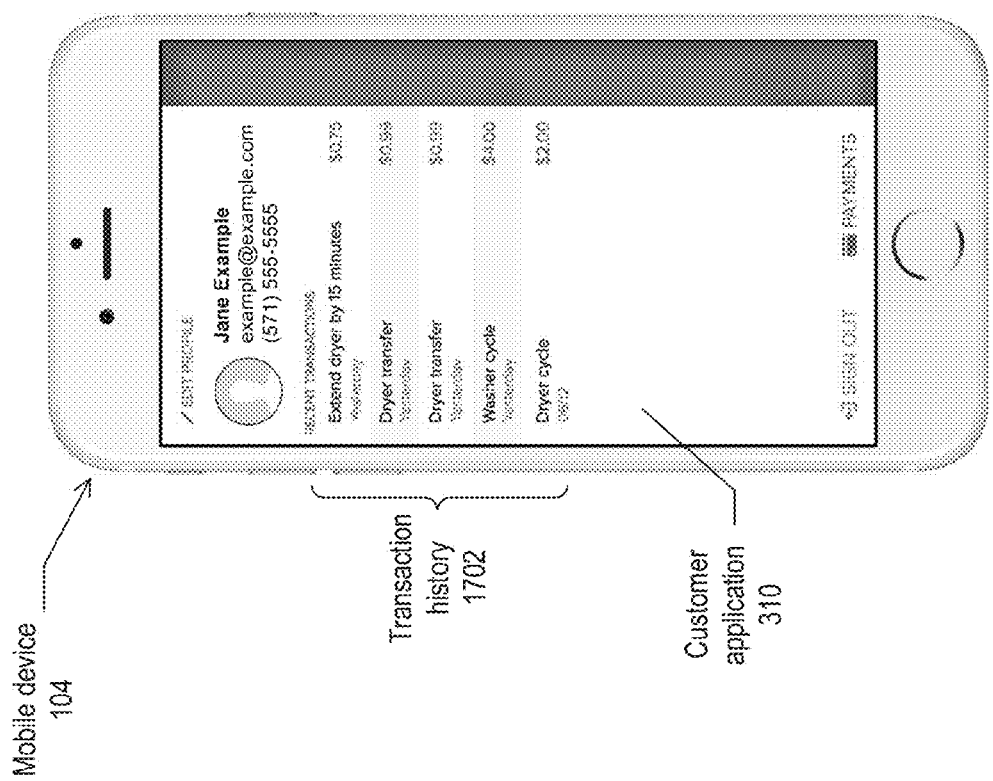
FIG. 17 depicts an example user interface that may be employed to interact with a laundry service in accordance with implementations of the present disclosure.

FIG. 17 depicts an example of a UI screen that the customer application 310 may employ to present a transaction history 1702 for the user 102. The transaction history 1702 may describe recent transactions that were processed during a recent period of time (e.g., in the last month). In some cases, the transaction history 1702 may describe transactions that were processed since the user 102 registered with the laundry service.

Figure 18:
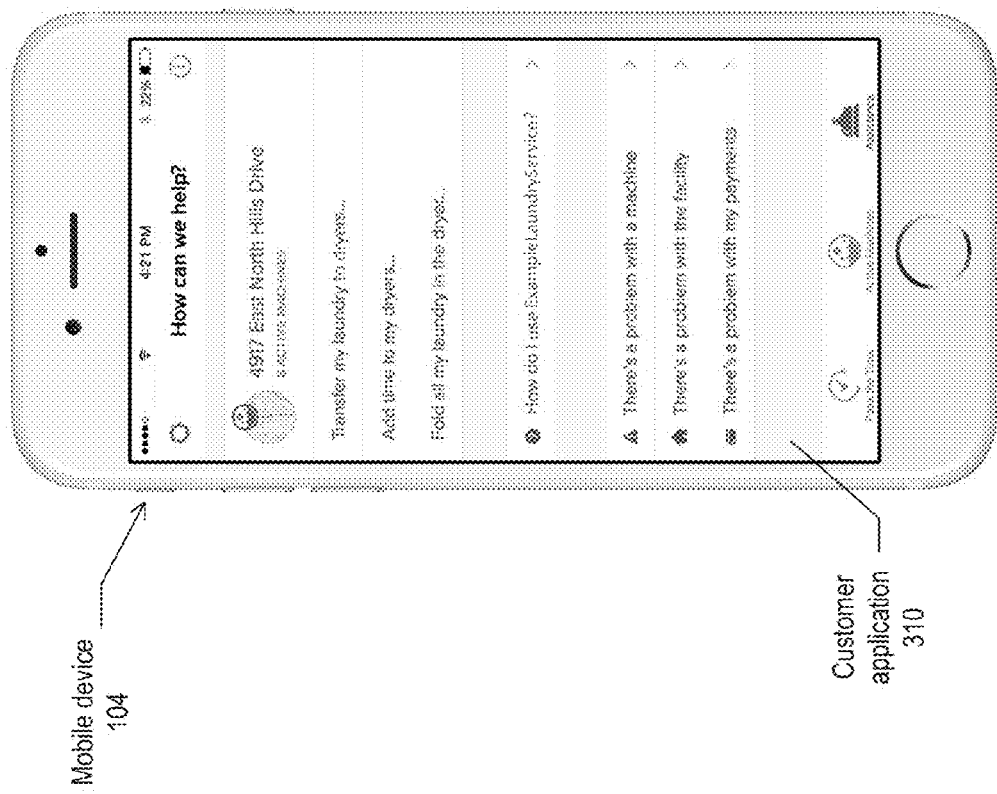
FIG. 18 depicts an example user interface that may be employed to interact with a laundry service in accordance with implementations of the present disclosure.

FIG. 18 depicts an example UI screen of the customer application 310 that may be employed, by the user 102 to interact with the laundry service. In some implementations, the customer application 310 includes feature(s) that enable the user 102 to request customer assistance or to request additional services such as those described with reference to FIGS. 5 and 12. In the example of FIG. 18, the UI provides features to enable the user 102 to request additional services such as transferring laundry to dryer(s) from washer(s), adding time to dryers, and folding laundry. In response to a gesture on one of these features, the customer application 310 may cause a service request 502 to be sent to the management module(s) 206, which may send the service request 502 to the attendant as described above.

As shown in the example of FIG. 18, the UI may also include a feature to enable the user 102 to request information describing how to use the laundry service. In response to a user's selection of the feature, the UI may present one or more help page(s) that include instructions, frequently asked questions, instructional videos, or other information. The UI may also include feature(s) to enable the user 102 to report a problem with a laundry machine 112, the laundromat 100 facility, or with the user's payments. Selection of one of these features (e.g., through selection of the disclosure indicator arrow of a feature) may result in the UI presenting an additional screen to enable the user 102 to enter details regarding the problem. For example, selecting the "There's a problem with my machine" feature may cause the presentation of a screen that enables the user 102 to select from a list of more specific problems, such as the machine not working, the machine door not opening, the washer not filling with water, and so forth. As another example, selecting the "There's a problem with the facility" feature may cause the presentation of a screen that enables the user 102 to select from a list of more specific problems, such as the laundromat 100 being unclean or unsafe, something in the laundromat 100 being broken, or other issues. The subsequent screen(s) may also enable the user 102 to enter a free form text message describing the issue, or other information.

The support or assistance features may also include in-app messaging, voice calling, or other features to enable the user 102 to interact with support personnel who are not on site in the laundromat 100. The support provided by such interaction, as well as the support provided via the assistance UI depicted in FIG. 18, may provide assistance to a user 102 when an attendant is not currently present in the laundromat 100, or when the laundromat 100 is typically unattended such as in a dormitory, apartment building, or other environments. By enabling constant assistance to customers, implementations provide a reassuring user experience in which the customer may never be without help (e.g., a "you're never alone" feature of the laundry service). In at least this way, implementations may provide a more positive user experience than traditional laundromats which, when unattended, may leave the customer substantially on their own when problems occur.

FIGS. 19-22 depict example UIs for providing analytics regarding the laundry service. As described above with reference to FIG. 11, in some implementations operational data may be collected from laundry machine(s) 112 in one or more laundromats 100. Operational data may also be retrieved from the status information 208 or other data. Operational data may be analyzed to generate analytics output that is presented on a management console or other UI. In some implementations, the management console may be a UI that is presented by the management module(s) 206 executing on the management server device(s) 204. Analytics information may also be presented on a UI on an attendant's mobile device 104, or on other device(s).

Figure 19:
FIG. 19 depicts an example user interface for providing analytics regarding a laundry service in accordance with implementations of the present disclosure.

FIG. 19 depicts an example of an analytics UI 1902 that may include the results of analyzing operational data collected within the laundry service. In the example of FIG. 19, the analytics UI 1902 is presenting a list of issues (e.g., problems) reported at a particular laundromat 100. The list may include one or more of the following: the user 102 who reported the issue (e.g., reporter); a category of the issue, such as whether the issue was with payment, machine, or facility; the reporting method, such as whether the issue was reported through the customer application 310 (e.g., as shown in FIG. 18), through a web site, or through a telephone support line; the laundry service personnel who answered the issue; the amount of time before responding to the issue (e.g., support time); a feedback rating received from the user 102; a date and time when the issue was reported; or other information. The analytics UI 1902 may also present aggregate information regarding the issues, such as the total number of support tickets, the average support time, or the average customer feedback, during a selectable time period (e.g., day, week, month, etc.). As in the example shown, the analytics UI 1902 may also highlight issues for which the response time was high or the customer feedback was low.

Figure 20:
FIG. 20 depicts an example user interface for providing analytics regarding a laundry service in accordance with implementations of the present disclosure.

FIG. 20 depicts an example of the analytics UI 1902. In the example shown, a user of the management console has selected (e.g., clicked, moused over, etc.) one of the issues to view more detailed information regarding the selected issue. Such detailed information may be presented in a pop-up dialog, as in the example shown, or in a separate window. The detailed information may include the original issue report from the user 102 (e.g., the customer message) as well as the response from support personnel.

Figure 21:
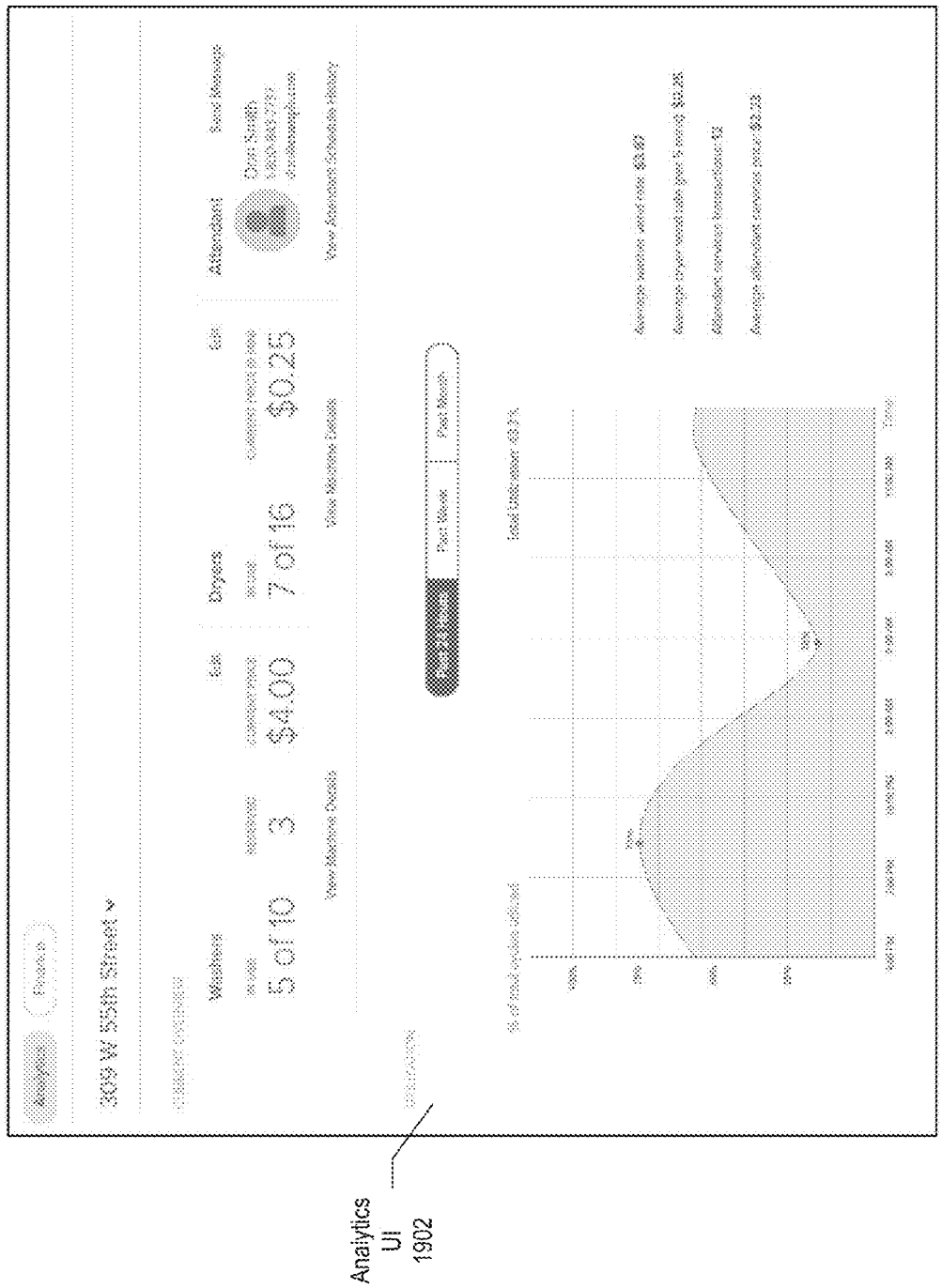
FIG. 21 depicts an example user interface for providing analytics regarding a laundry service in accordance with implementations of the present disclosure.

FIG. 21 depicts an example of the analytics UI 1902 presenting historical or trend data for utilization of a particular laundromat 100. The trend data may show the utilization of laundry machine(s) 112 in a laundromat 100 over a selectable period of time, such as over the past day, week, or month. In the example shown, the utilization is described as a percentage of the total cycles utilized. The utilization may also be described as the proportion of laundry machine(s) 112 used, or other metrics. The utilization may be presented as a graph, as in the example shown, or using other presentation methods. The utilization information may include the average washer vend rate, the average dryer vend rate, the number of attendant services transactions (e.g., for additional services), and the average attendant services price.

The analytics UI 1902 may also present a current overview of the laundromat 100, as shown in FIG. 21. The current overview may include one or more of: the number of washers in use, the number of washers reserved, the current price of a wash; the number of dryers in use, the current price per time for drying, or other information. The current overview may also include information regarding the attendant currently staffing the laundromat 100, if an attendant is currently present. The current overview may include links or other features that cause the analytics UI 1902 to present machine details regarding the washers or dryers in use or available, present a history of the attendant schedule, or send a message to the attendant.

Figure 22:
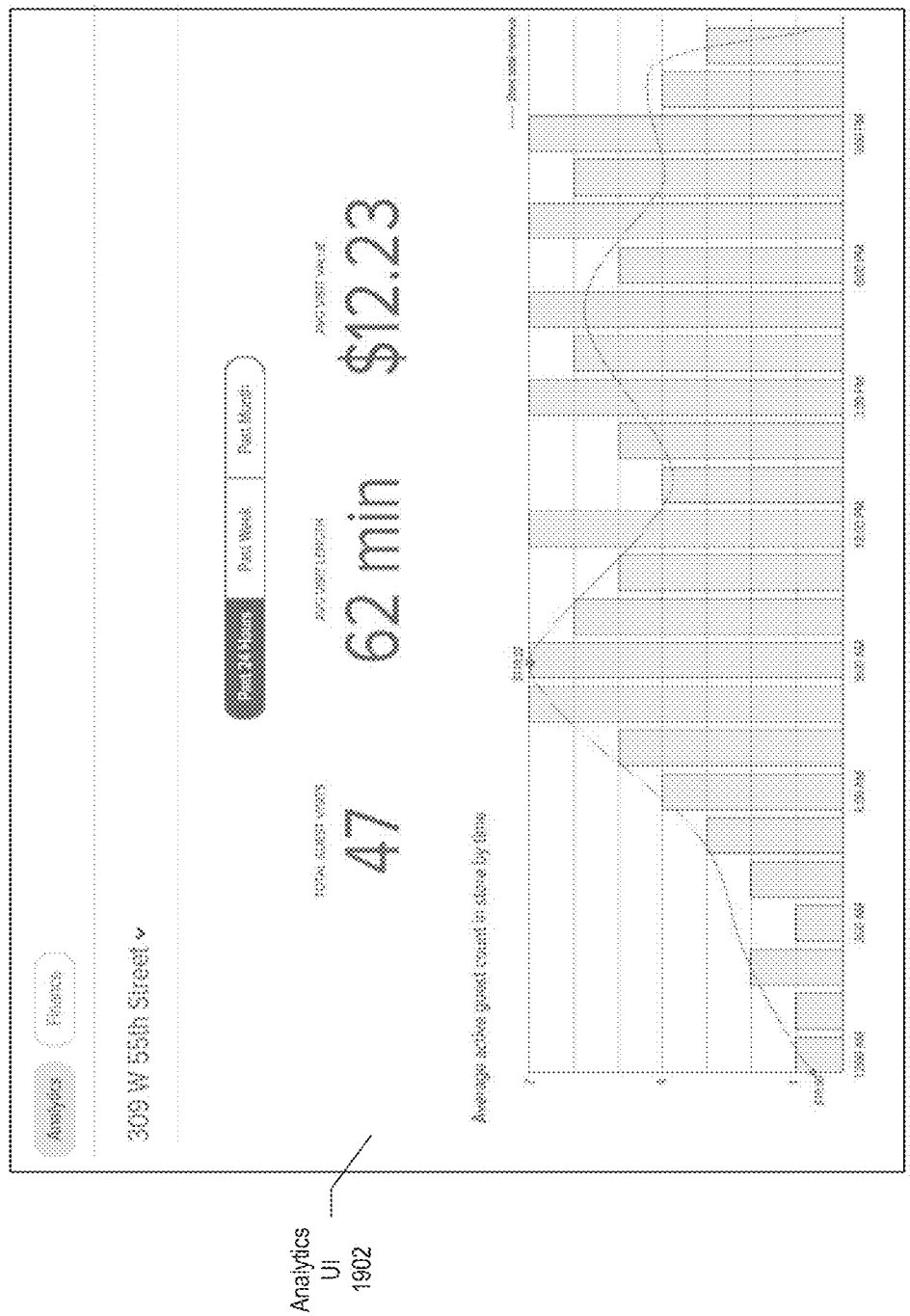
FIG. 22 depicts an example user interface for providing analytics regarding a laundry service in accordance with implementations of the present disclosure.

FIG. 22 depicts an example of the analytics UI 1902 presenting historical or trend data for the number of guests (e.g., users 102 who are customers) in a laundromat 100. As in the example shown, the trend data may show the number of guests in a laundromat 100 over a selectable period of time, such as over the past day, week, or month. The guest number data may be statistically analyzed to determine a fitted curved and a peak usage time (or date), as shown in the example. The operational data may also be analyzed to determine other statistical metrics. The analytics UI 1902 may present information describing the total number of guest visits, average visit length, and average visit value over the selected time period. The analytics UI 1902 may also present any other information regarding the laundromat 100, the laundry machine(s) 112 in the laundromat 100, the users 102 of the laundromat 100, and so forth.

Figure 23:
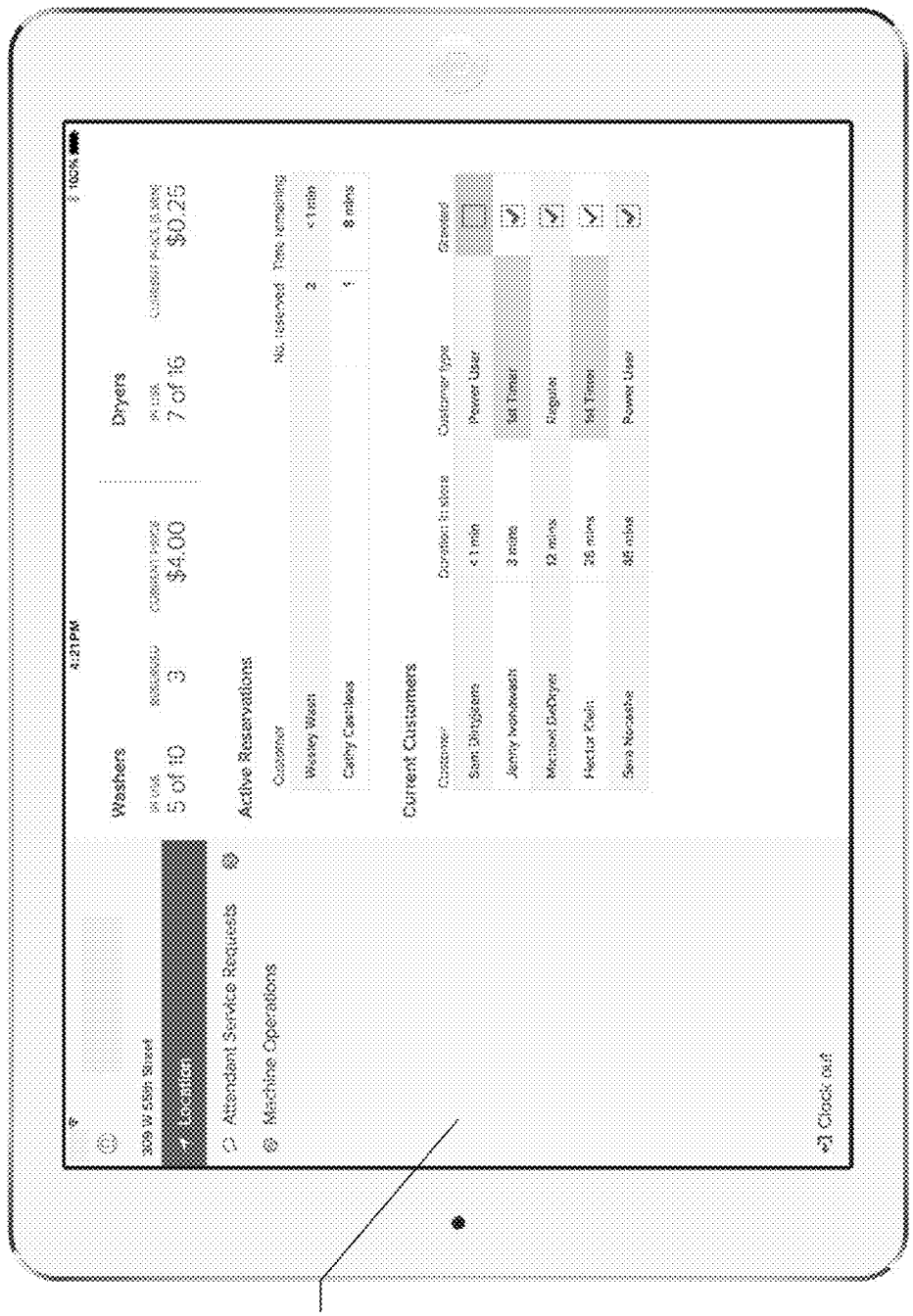
FIG. 23 depicts an example user interface that may be employed by an attendant in a laundromat in accordance with implementations of the present disclosure.

FIG. 23 depicts an example user interface that may be employed by an attendant in a laundromat in accordance with implementations of the present disclosure. The attendant UI 2302 may be presented on a mobile device 104 operated by an attendant such as user 506. As shown in the example of FIG. 23, the attendant UI 2302 may present information associated with a particular laundromat 100 (e.g., 309 W 55th Street). The attendant UI 2302 may present one or more of the following: the number of washers currently in use; the total number of washers in the laundromat 100; the number of washers reserved; the current price for washing; the number of dryers currently in use; the total number of dryers in the laundromat 100; the current price (e.g., per time increment) for drying; the customers who have active reservations at the laundromat 100; the number of machines 112 reserved by customers; the amount of time remaining on the reservations; the current customers in the laundromat 100; or the amount of time each customer has spent in the laundromat 100. In some implementations, the attendant UI 2302 presents information indicating a customer type for each customer currently in the laundromat 100, such as whether the customer is a first time user of the service, a regular user, or a power user (e.g., frequent user). In some cases, the attendant UI 2302 may highlight first time users for particular attention by the attendant, to ensure the first visit is a positive user experience. In some cases, the attendant UI 2302 may include controls to enable the attendant UI 2302 to indicate whether the attendant has greeted each customer currently in the laundromat 100. Customers who have not yet been greeted may be highlighted in the attendant UI 2302. The attendant UI 2302 may also present other information, such as information regarding the service instructions 1216 to be performed by the attendant, or information regarding current or historical machine operations.

Figure 24:
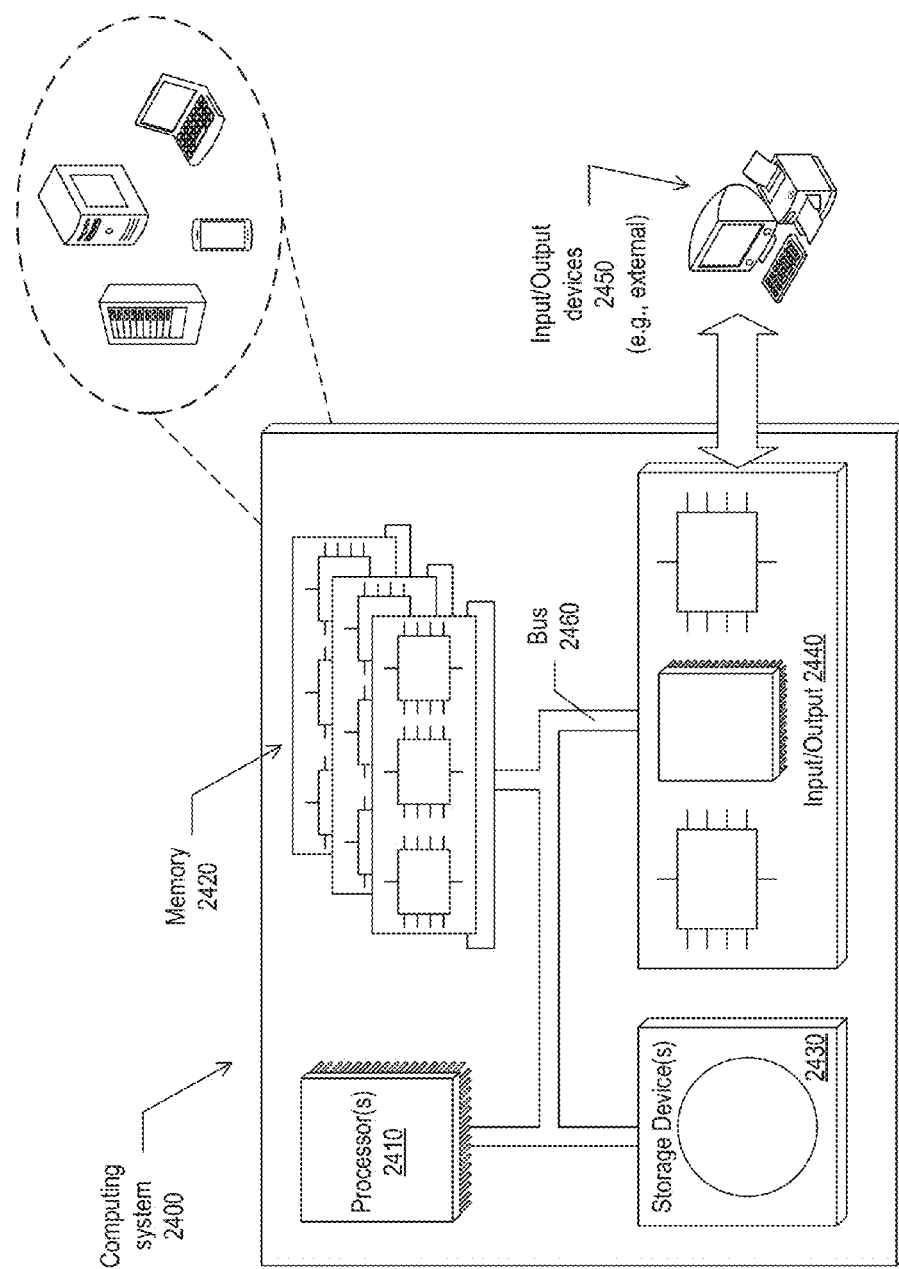
FIG. 24 depicts an example computing system architecture in accordance with implementations of the present disclosure Like reference symbols in the various drawings indicate like elements.

FIG. 24 depicts an example computing system 2400 in accordance with implementations such as those of the present disclosure. The system 2400 may be used for any of the operations described with respect to the various implementations discussed herein. For example, the system 2400 may be included, at least in part, in one or more of the mobile device 104, other user device(s), the management server device(s) 204, or the microcontroller 302 described herein. The system 2400 may include one or more processors 2410, a memory 2420, one or more storage devices 2430, and one or more input/output (I/O) devices 2450 controllable via one or more I/O interfaces 2440. Two or more of the components 2410, 2420, 2430, 2440, or 2450 may be interconnected via at least one system bus 2460, which may enable the transfer of data between the various modules and components of the system 2400.

The processor(s) 2410 may be configured to process instructions for execution within the system 2400. The processor(s) 2410 may include single-threaded processor(s), multi-threaded processor(s), or both. The processor(s) 2410 may be configured to process instructions stored in the memory 2420 or on the storage device(s) 2430. The processor(s) 2410 may include hardware-based processor(s) each including one or more cores. The processor(s) 2410 may include general purpose processor(s), special purpose processor(s), or both.

The memory 2420 may store information within the system 2400. In some implementations, the memory 2420 includes one or more computer-readable media. The memory 2420 may include any number of volatile memory units, any number of non-volatile memory units, or both volatile and non-volatile memory units. The memory 2420 may include read-only memory, random access memory, or both. In some cases, the memory 2420 may be employed as active or physical memory by one or more executing software modules.

The storage device(s) 2430 may be configured to provide (e.g., persistent) mass storage for the system 2400. In some implementations, the storage device(s) 2430 may include one or more computer-readable media. For example, the storage device(s) 2430 may include a floppy disk device, a hard disk device, an optical disk device, or a tape device. The storage device(s) 2430 may include read-only memory, random access memory, or both. The storage device(s) 2430 may include one or more of an internal hard drive, an external hard drive, or a removable drive.

One or both of the memory 2420 or the storage device(s) 2430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 2400. In some implementations, the CRSM may include a data store that provides storage of computer-readable instructions or other information in a non-transitory format. The CRSM may be incorporated into the system 2400 or may be external with respect to the system 2400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some cases, the processor(s) 2410 and the memory 2420 may be supplemented by, or incorporated into, one or more application-specific integrated circuits (ASICs).

The system 2400 may include one or more I/O devices 2450. The I/O device(s) 2450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 2450 may also include one or more output devices such as a display, LED(s), an audio output device (e.g., a speaker), a printer, a haptic output device, and so forth. The I/O device(s) 2450 may be physically incorporated in one or more computing devices of the system 2400, or may be external with respect to one or more computing devices of the system 2400.

The system 2400 may include one or more I/O interfaces 2440 to enable components or modules of the system 2400 to control, interface with, or otherwise communicate with the I/O device(s) 2450. The I/O interface(s) 2440 may enable information to be transferred in or out of the system 2400, or between components of the system 2400, through serial communication, parallel communication, or other types of communication. For example, the I/O interface(s) 2440 may comply with a version of the RS-232 standard for serial ports, or with a version of the IEEE 1284 standard for parallel ports. As another example, the I/O interface(s) 2440 may be configured to provide a connection over Universal Serial Bus (USB) or Ethernet. In some cases, the I/O interface(s) 2440 may be configured to provide a serial connection that is compliant with a version of the IEEE 1394 standard.

The I/O interface(s) 2440 may also include one or more network interfaces that enable communications between computing devices in the system 2400, or between the system 2400 and other network-connected computing systems. Such network interface(s) may include network interface(s) 304*a* and 304*b*. The network interface(s) may include one or more network interface controllers (NICs) or other types of transceiver devices configured to send and receive communications over one or more networks, such as the network(s) 202, using any network protocol.

Computing devices of the system 2400 may communicate with one another, or with other computing devices, using one or more networks such as the network(s) 202. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 2400, such as the mobile device 104, the management server device(s) 204, or the microcontroller 302, may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a SoC, a SiP, and so forth. Although examples herein may describe computing device(s) as physical device(s), implementations are not so limited. In some cases, a computing device may include one or more of a virtual computing environment, a hypervisor, an emulation, or a virtual machine executing on one or more physical computing devices. In some cases, two or more computing devices may include a cluster, cloud, farm, or other grouping of multiple devices that coordinate operations to provide load balancing, failover support, parallel processing capabilities, shared storage resources, shared networking capabilities, or other aspects.

The features described may be implemented in digital electronic circuitry or in computer hardware, software, or any combinations of hardware and software. The features may be implemented in at least one computer program product that is tangibly embodied in an information carrier (e.g., a machine-readable storage device) for execution by a programmable processor. The method or process steps may be performed by a programmable processor executing instructions to perform functions of the described implementations by operating on input data and generating output. The described features may be implemented in one or more computer programs that are executable on a programmable system including at least one programmable processor coupled to receive data and instructions from, and to transmit data and instructions to, a data storage system, at least one input device, and at least one output device. A computer program may include a set of instructions that can be used, directly or indirectly, in a computer to perform a certain activity or bring about a certain result. A computer program may be written in any form of programming language, including compiled or interpreted languages, and it may be deployed in any form, including as a stand-alone program or as a module suitable for use in a computing environment.

The logic flows depicted in the figures do not require the particular order shown, or any particular sequential order, to achieve desirable results. In some implementations, other steps may be provided or steps may be eliminated from the described flows. Moreover, the steps may be performed in parallel or serially with respect to other steps. The systems depicted in the figures do not require the particular components, or the particular arrangement of components, shown in the figures. In some implementations, the various systems may include more or fewer components than shown in the figures, and components may be arranged differently to achieve desirable results. Accordingly, implementations other than those explicitly depicted in the figures or described herein are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method performed by at least one processor of a mobile computing device, the method comprising:
   receiving, by the at least one processor, using a wireless network interface of the mobile computing device, a plurality of beacon signals each emitted from a respective one of a plurality of laundry machines, each respective beacon signal identifying a respective laundry machine;
   determining, by the at least one processor, that the mobile computing device is within a threshold distance of a particular laundry machine of the plurality of laundry machines, based on the respective beacon signal from the laundry machine exhibiting a signal level that is: i) higher than that of other beacon signals emitted from other laundry machines of the plurality of laundry machines, and ii) at least a threshold level that corresponds to the threshold distance; and
   in response to determining that the mobile computing device is within the threshold distance of the laundry machine, sending a request for use of the laundry machine during a period of time.

2. The method of claim 1, wherein the request is sent to request use of the laundry machine for the period of time corresponding to at least one laundry cycle of the laundry machine.

3. The method of claim 1, wherein the threshold distance is determined based at least partly on a calibration to measure distance versus signal level for a transmitted power of the beacon signal.

4. The method of claim 1, wherein the threshold distance corresponds to physical contact between the mobile computing device and the laundry machine.

5. The method of claim 1, wherein:
   the request is communicated from the mobile computing device to at least one management computing device;
   the request causes the at least one management computing device to communicate at least one control signal from the at least one management computing device to the laundry machine; and
   the at least one control signal causes the laundry machine to be useable during the period of time.

6. The method of claim 1, wherein the beacon signal is at least partly compliant with a version of a Bluetooth Low Energy standard.

7. The method of claim 1, further comprising:
   receiving, by the at least one processor, an indication that the period of time has ended; and
   presenting, by the at least one processor, through a user interface (UI) on the mobile computing device, the indication that the period of time has ended.

8. The method of claim 7, further comprising:
   detecting, by the at least one processor, a command entered through the UI, the command indicating an additional period of time for use of the laundry machine; and
   communicating, by the at least one processor, a service request to request use of the laundry machine during the additional period of time.

9. The method of claim 1, further comprising:
   providing, by the at least one processor, through a user interface (UI) on the mobile computing device, a payment corresponding to the period of time during which the laundry machine is used.

10. The method of claim 1, further comprising:
    determining, by the at least one processor, a location of the mobile computing device;
    presenting, by the at least one processor, through a user interface (UI) on the mobile computing device, location information for one or more laundromats in proximity to the mobile computing device;
    detecting, by the at least one processor, a selection through the UI indicating a laundromat of the one or more laundromats; and
    sending, by the at least one processor, a reservation request to request a reservation of one or more laundry machines in the laundromat.

11. A system comprising:
    a wireless network interface;
    at least one processor communicatively coupled to the wireless network interface; and
    a memory communicatively coupled to the at least one processor, the memory storing instructions which, when executed, cause the at least one processor to perform operations comprising:
- receiving, using the wireless network interface, a plurality of beacon signals each emitted from a respective one of a plurality of laundry machines, each respective beacon signal identifying a respective laundry machine;
- determining that the system is within a threshold distance of a particular laundry machine of the plurality of laundry machines, based on the respective beacon signal from the laundry machine exhibiting a signal level that is: i) higher than that of other beacon signals emitted from other laundry machines of the plurality of laundry machines, and ii) at least a threshold level that corresponds to the threshold distance; and
- in response to determining that the system is within the threshold distance of the laundry machine, sending a request for use of the laundry machine during a period of time.

12. The system of claim 11, wherein the request is sent to request use of the laundry machine for the period of time corresponding to at least one laundry cycle of the laundry machine.

13. The system of claim 11, wherein the threshold distance is determined based at least partly on a calibration to measure distance versus signal level for a transmitted power of the beacon signal.

14. The system of claim 11, wherein the threshold distance corresponds to physical contact between the mobile computing device and the laundry machine.

15. The system of claim 11, wherein:
- the request is communicated to at least one management computing device;
- the request causes the at least one management computing device to communicate at least one control signal to the laundry machine; and
- the at least one control signal causes the laundry machine to be useable during the period of time.

16. The system of claim 11, wherein the beacon signal is at least partly compliant with a version of a Bluetooth Low Energy standard.

17. One or more computer-readable media storing instructions which, when executed by at least one processor of a mobile computing device, cause the at least one processor to perform operations comprising:
- receiving, using a wireless network interface of the mobile computing device, a plurality of beacon signals each emitted from a respective one of a plurality of laundry machines, each respective beacon signal identifying a respective laundry machine;
- determining that the mobile computing device is within a threshold distance of a particular laundry machine of the plurality of laundry machines, based on the respective beacon signal from the laundry machine exhibiting a signal level that is: i) higher than that of other beacon signals emitted from other laundry machines of the plurality of laundry machines, and ii) at least a threshold level that corresponds to the threshold distance; and
- in response to determining that the mobile computing device is within the threshold distance of the laundry machine, sending a request for use of the laundry machine during a period of time.

18. The one or more computer-readable media of claim 17, wherein the request is sent to request use of the laundry machine for the period of time corresponding to at least one laundry cycle of the laundry machine.

19. The one or more computer-readable media of claim 17, wherein the threshold distance is determined based at least partly on a calibration to measure distance versus signal level for a transmitted power of the beacon signal.

20. The one or more computer-readable media of claim 17, wherein the threshold distance corresponds to physical contact between the mobile computing device and the laundry machine.

* * * * *